United States Patent
Lee et al.

(10) Patent No.: US 12,035,007 B2
(45) Date of Patent: Jul. 9, 2024

(54) COMPUTING DEVICE AND OPERATING METHOD THEREOF

(71) Applicant: SAMSUNG ELECTRONICS CO., LTD., Suwon-si (KR)

(72) Inventors: Keuntek Lee, Suwon-si (KR); Kwanki Ahn, Suwon-si (KR); Jayoon Koo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 477 days.

(21) Appl. No.: 17/312,295

(22) PCT Filed: Jan. 8, 2021

(86) PCT No.: PCT/KR2021/000255
§ 371 (c)(1),
(2) Date: Jun. 9, 2021

(87) PCT Pub. No.: WO2021/187734
PCT Pub. Date: Sep. 23, 2021

(65) Prior Publication Data
US 2023/0362444 A1    Nov. 9, 2023

(30) Foreign Application Priority Data
Mar. 19, 2020    (KR) .................. 10-2020-0034058

(51) Int. Cl.
*H04N 21/466*    (2011.01)
(52) U.S. Cl.
CPC ..... *H04N 21/4666* (2013.01); *H04N 21/4667* (2013.01)
(58) Field of Classification Search
CPC .......... G06N 3/08; G06N 3/04; G06N 3/045; H04N 21/4666; H04N 21/4668;
(Continued)

(56) References Cited

U.S. PATENT DOCUMENTS

| 8,010,536 B2 | 8/2011 | Nemeth et al. |
| 10,255,628 B2 | 4/2019 | Li et al. |

(Continued)

FOREIGN PATENT DOCUMENTS

| KR | 10-2018-0002944 A | 1/2018 |
| KR | 10-2018-0121466 A | 11/2018 |

(Continued)

OTHER PUBLICATIONS

Communication dated Apr. 14, 2021, issued by the International Searching Authority in counterpart International Application No. PCT/KR2021/000255 (PCT/ISA/220, 210, 237).

(Continued)

*Primary Examiner* — Ngoc K Vu
(74) *Attorney, Agent, or Firm* — Sughrue Mion, PLLC

(57) ABSTRACT

The disclosure relates to an artificial intelligence (AI) system and an application thereof. A computing device disclosed includes: a memory storing one or more instructions; and a processor configured to execute the one or more instructions stored in the memory, wherein the processor is configured to execute the one or more instructions to input a recommendation recipient's consumption information to a first neural network configured to receive item consumption information of a user and reconstruct the item consumption information and a second neural network embedded into the first neural network and having been trained with respect to metadata consumption information corresponding to the item consumption information, and obtain item recommendation information to which the metadata consumption information is reflected.

15 Claims, 14 Drawing Sheets

(58) Field of Classification Search
CPC ............... H04N 21/466; H04N 21/258; H04N 21/25883; H04N 21/2668
See application file for complete search history.

(56) References Cited

U.S. PATENT DOCUMENTS

| | | | |
|---|---|---|---|
| 10,402,726 B1* | 9/2019 | Moore | G06N 7/01 |
| 10,650,432 B1* | 5/2020 | Joseph | G06N 3/08 |
| 11,004,135 B1* | 5/2021 | Sandler | G06Q 30/0631 |
| 2017/0185894 A1* | 6/2017 | Volkovs | G06N 3/08 |
| 2018/0276542 A1 | 9/2018 | Cheng et al. | |
| 2019/0215551 A1 | 7/2019 | Modarresi et al. | |
| 2020/0019842 A1 | 1/2020 | Kim | |
| 2020/0160065 A1 | 5/2020 | Weinzaepfel | |

FOREIGN PATENT DOCUMENTS

| | | |
|---|---|---|
| KR | 10-2019-0047576 A | 5/2019 |
| KR | 10-2019-0087351 A | 7/2019 |
| KR | 10-2019-0103505 A | 9/2019 |
| KR | 10-2020-0018283 A | 2/2020 |

OTHER PUBLICATIONS

Jhamb et al., "Attentive Contextual Denoising Autoencoder for Recommendation," Association for Computing Machinery, ICTIR '18, Keynote, Sep. 14-17, 2018, pp. 27-34.

* cited by examiner

COMPUTING DEVICE AND OPERATING METHOD THEREOF

TECHNICAL FIELD

Various embodiments relate to a computing device and an operating method thereof, and more particularly, to a computing device of providing item information considering metadata by using an Artificial Intelligence (AI) model, and an operating method thereof.

BACKGROUND ART

A recommender system is a system for recommending movies, content, items, etc. for users. Internet shopping sites such as Amazon or online video content-providing sites such as Netflix recommend new content for a user based on the user's consumption history, such as an item purchase history, a watching history, or a rating, and other users' consumption histories.

An Artificial Intelligence (AI) system is a system in which a machine itself performs training, makes determinations, deduces targeted results, or performs targeted operations.

DESCRIPTION OF EMBODIMENTS

Solution to Problem

A computing device according to an embodiment includes: a memory storing one or more instructions; and a processor configured to execute the one or more instructions stored in the memory, wherein the processor is configured to execute the one or more instructions to input a recommendation recipient's consumption information to a first neural network configured to receive item consumption information of a user and reconstruct the item consumption information and a second neural network embedded into the first neural network and having been trained with respect to metadata consumption information corresponding to the item consumption information, and obtain item recommendation information to which the metadata consumption information is reflected.

MODE OF DISCLOSURE

Figure 1:
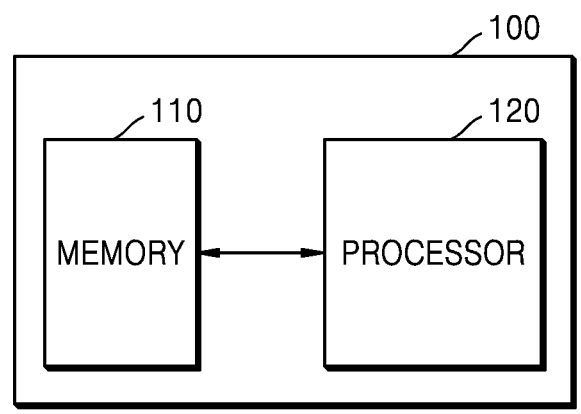
FIG. 1 is an internal block diagram of a computing device 100 according to an embodiment.

According to an embodiment, a first neural network may be a collaborative filtering model using an auto-encoder model configured to encode item consumption information to obtain a latent layer having compressed information for the item consumption information and decode the latent layer to reconstruct the item consumption information.

According to an embodiment, a second neural network may include N neural networks that independently have trained consumption information for N (N is a natural number that is greater than 2) different pieces of metadata.

According to an embodiment, each of the N neural networks may include an embedding node, and embedding nodes of the N neural networks may be embedded into the latent layer of the first neural network.

According to an embodiment, the recommendation recipient's consumption information may include at least one of the recommendation recipient's item consumption information and the recommendation recipient's metadata preference information, and, when the recommendation recipient's metadata preference information is preference information for M (M is a natural number that is less than N) pieces of metadata, the processor may activate M neural networks among the N neural networks included in the second neural network and obtain item recommendation information to which M pieces of the metadata consumption information are reflected.

According to an embodiment, the processor may activate the M neural networks by setting an edge value entering an embedding node except for embedding nodes of the M neural networks among the embedding nodes of the N neural networks, to 0.

According to an embodiment, the processor may activate the M neural networks by mapping the embedding nodes of the M neural networks among the embedding nodes of the N neural networks to new nodes having an edge value of 1, and mapping the remaining embedding nodes to other new nodes having an edge value of 0.

According to an embodiment, the processor may train the first neural network to receive the item consumption information of the user and reconstruct the item consumption information, embed the second neural network into the first neural network which has completed training, and then train the second neural network to output reconstructed information from the first neural network when the item consumption information of the user and metadata information for the item are input to the first neural network and the second neural network.

According to an embodiment, the processor may train the second neural network, in the state in which an edge value of the first neural network is fixed.

According to an embodiment, the processor may independently embed the embedding nodes of the N neural networks into the latent layer to independently train the N neural networks.

According to an embodiment, the second neural network may include a consumption information vector representing metadata consumption information of the user, and an embedding matrix configured to perform an operation with the consumption information vector to obtain an embedding vector, the embedding vector may be mapped to a preset number of embedding nodes and embedded into the latent layer, and the processor may train the embedding matrix to obtain output values of the embedding nodes.

According to an embodiment, the processor may obtain the preset number of embedding nodes by reducing a dimension of the embedding vector through a preset number of hidden layers.

According to an embodiment, the computing device may further include a communicator configured to transmit/receive a signal to/from a user equipment (UE), wherein the communicator may receive the recommendation recipient's consumption information from the UE, and the processor may obtain the item recommendation information to which the metadata consumption information is reflected and transmit the item recommendation information to the UE through the communicator.

According to an embodiment, the recommendation recipient's consumption information may include at least one of the recommendation recipient's item consumption information and the recommendation recipient's metadata preference information, the computing device may further include a display outputting an image, and a user interface configured to receive the recommendation recipient's consumption information, and the processor may execute the one or more instructions to output, through the display, item recommendation information to which consumption information for metadata corresponding to the recommendation recipient's metadata preference information input through the user interface is reflected.

A method of operating a computing device according to an embodiment includes: inputting a recommendation recipient's item consumption information and the recommendation recipient's metadata consumption information to a first neural network trained to receive item consumption information of a user and reconstruct the item consumption information and a second neural network embedded into the first neural network and having been trained with respect to metadata consumption information of the user; and obtaining item recommendation information to which the metadata consumption information is reflected from the first neural network and the second neural network.

A computer-readable recording medium according to an embodiment may be a computer-readable recoding medium storing a program for implementing a method of operating a computing device, the method including: inputting a recommendation recipient's item consumption information and the recommendation recipient's metadata consumption information to a first neural network trained to receive item consumption information of a user and reconstruct the item consumption information and a second neural network embedded into the first neural network and having been trained with respect to metadata consumption information of the user; and obtaining item recommendation information to which the metadata consumption information is reflected from the first neural network and the second neural network.

Hereinafter, embodiments of the disclosure will be described in detail with reference to the accompanying drawings so that the disclosure may be readily implemented by those skilled in the art. However, the disclosure is not limited to these embodiments of the disclosure, and may be embodied in various other forms.

Although general terms being widely used in the present specification were selected as terminology used in the disclosure while considering the functions of the disclosure, they may vary according to intentions of one of ordinary skill in the art, judicial precedents, the advent of new technologies, and the like. Hence, the terms must be defined based on the meanings of the terms and the contents of the entire specification, not by simply stating the terms themselves.

Also, the terms used in the disclosure are used for describing the specific embodiments, not for the purpose of limiting the disclosure.

In this specification, it will be understood that the case in which a certain part is "connected" to another part includes the case in which the part is "electrically connected" to the other part with another device in between, as well as the case in which the part is "directly connected" to the other part.

The term "said" and the similar terms used in the present specification, specifically, in the claims may indicate both single and plural. Also, if the order of operations for describing a method according to the disclosure is not definitely specified, the operations may be performed in appropriate order. However, the disclosure is not limited to the order in which the operations are described.

The phrases "in some embodiments" or "according to an embodiment" appearing in the present specification do not necessarily indicate the same embodiment.

Some embodiments of the disclosure may be represented by functional block configurations and various processing operations. The entire or a part of the functional blocks may be implemented with various numbers of hardware and/or software configurations to execute specific functions. For example, the functional blocks of the disclosure may be implemented with one or more microprocessors, or with circuit configurations for preset functions. Also, for example, the functional blocks of the disclosure may be implemented with various programming or scripting languages. The functional blocks may be implemented with algorithms that are executed by one or more processors. Also, the disclosure may adopt typical technologies for electronic environment settings, signal processing, and/or data processing. The terms "mechanism", "element", "means", and "configuration" can be broadly used, and are not limited to mechanical and physical configurations.

Also, connection lines or connection members between components shown in the drawings are examples of functional connections and/or physical or circuital connections. In an actual device, the connections between the components may be implemented in the form of various functional connections, physical connections, or circuital connections that can be replaced or added.

As used herein, the terms "portion", "module", or "unit" refers to a unit that can perform at least one function or operation, and may be implemented as a software or hardware component or as a combination of software and hardware.

Also, in the specification, the term "user" means a person who uses a computing device or an image display to control functions or operations of the computing device or the image display or use the image display according to its functions, and may include a viewer, a network administrator, or an installation engineer. Also, in the specification, the term "recommendation recipient" means a user who uses a computing device or an image display to input or set information about preferred metadata and receive a recommendation for an item obtained from the computing device or the image display in correspondence to the information.

Hereinafter, the disclosure will be described in detail with reference to the accompanying drawings.

FIG. 1 is an internal block diagram of a computing device 100 according to an embodiment. Referring to FIG. 1, the computing device 100 may include a memory 110 and a processor 120.

According to an embodiment, the computing device 100 may be an electronic device that receives a recommendation recipient's consumption information, and obtains information about an item to be recommended for the recommendation recipient. The item may include various types of content, such as a program that is provided from a television (TV), a movie or documentary that is provided from a video on demand (VOD) service, etc. The item may include, as a media signal, at least one of a video signal, an audio signal, and a text signal.

According to an embodiment, the computing device 100 may be included in an image display (not shown) or an external device connected to an image display through a communication network. According to an embodiment, the computing device 100 may be manufactured in a form of at least one hardware chip and mounted on an electronic device, or may be included in a form of a chip or an electronic device in a server. Alternatively, the computing device 100 may be implemented as a software module.

The memory 110 according to an embodiment may store at least one instruction. The memory 110 may store at least one program that is executed by the processor 120. Also, the memory 110 may store data that is input to or output from the computing device 100.

According to an embodiment, the memory 110 may store a user's item consumption information. The memory 110 may store item consumption information about a plurality of unspecified users' item consumption through various methods, such as watching or purchasing items.

According to an embodiment, the memory 110 may store metadata corresponding to users' item consumption information in a form of a table, etc. Also, the memory 110 may receive, from a user (that is, a recommendation recipient) for which an item will be recommended, the recommendation recipient's consumption information and store the recommendation recipient's consumption information. Also, the memory 110 may store preference information about specific metadata set by the recommendation recipient.

The memory 110 may include at least one type of storage medium among a flash memory type, a hard disk type, a multimedia card micro type, a card type memory (e.g., SD or XD memory), Random Access Memory (RAM), Static Random Access Memory (SRAM), Read Only Memory (ROM), Electrically Erasable Programmable Read-Only Memory (EEPROM), Programmable Read-Only Memory (PROM), a magnetic memory, a magnetic disk, or an optical disk.

The processor 120 may control overall operations of the computing device 100. The processor 120 may execute at least one instruction stored in the memory 110 to control the computing device 100 to perform its functions.

According to an embodiment, the computing device 100 may use artificial intelligence (AI) technology. The AI technology consists of machine learning (deep learning) and element technology based on the machine learning. The AI technology may be implemented by using an algorithm. An algorithm or a group of algorithms for implementing AI technology is called a neural network. A neural network receives input data, performs operations for analysis and classification, and outputs result data. For a neural network to correctly output result data corresponding to input data, the neural network needs to be trained. Herein, 'training' may mean training a neural network such that the neural network itself finds or learns a method of analyzing various input data, a method of classifying the input data, and/or a method of extracting a characteristic required to generate result data from the input data. Training a neural network means creating an AI model having a desired characteristic by applying a training algorithm to a plurality of pieces of training data. The training may be done by the computing device 100 itself on which AI is performed, or through a separate server/system, according to embodiments.

The training algorithm may be a method of training a preset target device (for example, a robot) by using a plurality of pieces of training data to enable the preset target device to make determinations or perform predictions. An example of the training algorithm may be supervised learning, unsupervised learning, semi-supervised learning, or reinforcement learning, and the training algorithm according to an embodiment is not limited to the above-mentioned examples except in the case of being stated explicitly.

A group of algorithms for outputting output data corresponding to input data through a neural network, software for executing the group of algorithms, and/or hardware for executing the group of algorithms are called an 'AI model' (or an 'artificial intelligence model').

The processor 120 may process input data according to a predefined operation rule or an AI model, stored in the memory 110. The predefined operation rule or the AI model has been created by using a specific algorithm. Also, the AI model may be a model in which a specific algorithm is trained.

The processor 120 may generate output data corresponding to input data through an AI model. According to an embodiment, the processor 120 may have stored at least one AI model. According to an embodiment, the processor 120 may generate final output data from input data by using a plurality of AI models.

According to an embodiment, the memory 110, instead of the processor 120, may have stored the AI models.

According to an embodiment, a neural network, which is used by the processor 120, may be a neural network trained to receive a user's item consumption information and reconstruct the user's item consumption information. That is, a neural network, which is used by the processor 120, may be a neural network trained to obtain a plurality of users' item consumption information from an external database (not shown) or the memory 110 and reconstruct a user's item consumption information from the plurality of users' item consumption information.

Also, according to an embodiment, the neural network, which is used by the processor 120, may be a neural network that trains metadata consumption information corresponding to item consumption information. Also, the metadata consumption information corresponding to the item consumption information may be information about metadata representing an attribute of the item consumed by a user. The neural network, which is used by the processor 120, may be a neural network trained to obtain metadata consumption information corresponding to a plurality of users' item consumption information from an external database or the memory 110, and obtain an item to which the metadata consumption information is reflected from the users' item consumption information and metadata consumption information.

The metadata representing the attribute of the item may be a plurality of pieces. For example, when an item is a movie, metadata representing an attribute of the movie may include a director, a genre, casts, an age, a region, a viewer rating, the number of viewers, etc.

According to an embodiment, the neural network, which is used by the processor 120, may include a plurality of neural networks that have independently trained a plurality of pieces of metadata corresponding to an item.

Accordingly, the processor 120 may input a recommendation recipient's consumption information to such a trained neural network. The recommendation recipient may be a user who intends to receive a recommendation for a desired item through the computing device 100.

According to an embodiment, the consumption information may include at least one of the recommendation recipient's item consumption information and the recommendation recipient's metadata preference information. The recommendation recipient's item consumption information may be history information representing an item, such as a program or content, purchased or watched by the recommendation recipient. The recommendation recipient's metadata preference information may be information representing metadata preferred by the recommendation recipient. For example, when an item is a movie, metadata preference information may be information about a movie director or a movie genre preferred by a recommendation recipient. When an item is a music file, metadata preference information may be information about a music genre or a singer preferred by a recommendation recipient.

The computing device 100 may receive a recommendation recipient's item consumption information and metadata preference information, and obtain new item information to be recommended for the recommendation recipient by using at least one neural network. At this time, the computing device 100 may activate only a neural network for preference metadata set by the recommendation recipient from among a plurality of neural networks respectively trained for individual kinds of metadata. For example, when an item is a movie, and a recommendation recipient sets information about a preferred director and information about a genre among various metadata, the computing device 100 may activate a neural network trained for directors and a neural network trained for genres and deactivate a neural network trained for actors or a neural network trained for filming locations, among a plurality of neural networks respectively trained for individual kinds of metadata.

The computing device 100 may reflect the recommendation recipient's metadata preference information for the director and genre to obtain an item to be recommended for the recommendation recipient.

Figure 2:
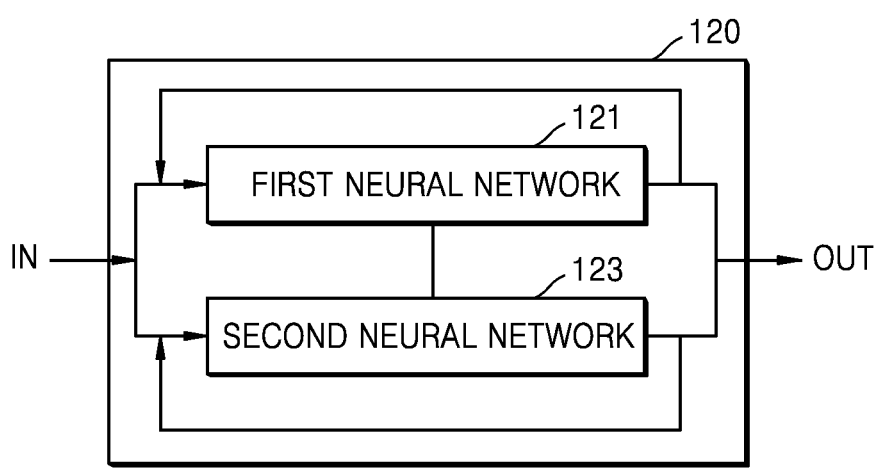
FIG. 2 is an internal block diagram of a processor 120 included in the computing device 100 according to an embodiment.

FIG. 2 is an internal block diagram of the processor 120 included in the computing device 100 according to an embodiment. Referring to FIG. 2, the processor 120 may include a first neural network 121 and a second neural network 123.

According to an embodiment, the first neural network 121 may be a neural network trained to receive a user's item consumption information and reconstruct the user's item consumption information.

According to an embodiment, the first neural network 121 may obtain a plurality of users' item consumption information from an external database (not shown) or the memory 110.

According to an embodiment, the first neural network 121 may be a collaborative filtering model using an auto-encoder model through deep learning.

The first neural network 121 may include an input layer, a hidden layer, and an output layer. The layers may each be expressed with at least one node, and the nodes of the layers may be connected to each other through edges. The first neural network 121 may reduce a dimension of a user's item consumption information, while compressing the user's item consumption information, thereby obtaining a latent layer. The latent layer may be a layer included in an inner center of a hidden layer of an auto-encoder model, and contain most implicated information about the user's item consumption. The latent layer may be expressed with at least one node. Hereinafter, the node included in the latent layer included in the first neural network 121 is referred to as a 'base node'.

The first neural network 121 may decode the latent layer to reconstruct its original data. Through the process, the first neural network 121 may detect a characteristic from the user's item consumption information, and generate a new item list to be recommended for the user.

According to an embodiment, the second neural network 123 may be a neural network that has been trained with respect to metadata consumption information corresponding to the user's item consumption information. According to an embodiment, the second neural network 123 may be a neural network embedded into the latent layer of the first neural network 121.

According to an embodiment, the second neural network 123 may be embedded into the first neural network 121 that has completed training, and trained. After training is completed, all edge values included in the first neural network 121 may have fixed real values.

The processor 120 may embed the second neural network 123 into the first neural network 121 that has completed training to connect the second neural network 123 to the first neural network 121, and then train the second neural network 123 by causing, when preset input information is input to the first neural network 121 and the second neural network 123, preset output information to be output. The preset input information may be the user's item consumption information and metadata information about the item. Also, the preset output information may be output information reconstructed by the first neural network 121 in a process of training the first neural network 121. That is, the processor 120 may input the user's item consumption information to the first neural network 121, which has completed training, and input metadata consumption information corresponding to the item consumption information to the second neural network 123 embedded into the first neural network 121. Also, the processor 120 may cause the first neural network 121, which has completed training, and the second neural network 123 embedded into the first neural network 121 to output information reconstructed as output information upon training of the first neural network 121.

According to an embodiment, the second neural network 123 may include a node embedded into the latent layer of the first neural network 121. Hereinafter, the node included in the second neural network 121 is referred to as an 'embedding node'. The processor 120 may embed the embedding node into the latent layer of the first neural network 121 by arranging the embedding node of the second neural network 123 in a line with the base node included in the latent layer of the first neural network 121, and fully connecting the embedding node to nodes included in layers before and after the latent layer of the first neural network 121.

According to an embodiment, the second neural network 123 may include N neural networks, which have trained consumption information about N (N is a natural number that is greater than or equal to 2) different pieces of metadata. For example, when an item watched by a user is a movie, metadata about the item may include various kinds of metadata describing the item, such as a director of the movie, a genre of the movie, casts of the movie, a viewer rating about the movie, a year of filming, the number of viewers, an age or region of the movie, etc.

The processor 120 may embed an embedding node of one (for example, a G-th (G is a natural number that is less than N) neural network) of the N neural networks included in the second neural network 123 into the latent layer of the first neural network 121, which has completed training, input the user's item consumption information and metadata consumption information corresponding to the G-th neural network to the first neural network 121 and the G-th neural network embedded into the latent layer of the first neural network 121, and train the G-th neural network by causing output information obtained upon training of the first neural network 121 to be output.

According to an embodiment, the N neural networks included in the second neural network 123 may be neural networks that have independently trained consumption information for various kinds of metadata about items. In order to independently train the N neural networks, the processor 120 may embed only the embedded node included in one (for example, the G-th neural network) of the N neural networks into the latent layer of the first neural network 121, thereby training the G-th neural network. Likewise, to train another one (for example, an L-th (L is a natural number that is less than N) neural network) of the N neural networks, the processor 120 may embed only an embedding node of the L-th neural network into the latent layer of the first neural network 121, thereby training the L-th neural network.

In this way, the processor 120 may independently train the N neural networks included in the second neural network 123.

After training is completed, all the embedded nodes of the N neural networks included in the second neural network 123 may be embedded in a line into the latent layer of the first neural network 121 to be fully connected to the nodes of the layers before and after the latent layer of the first neural network 121.

According to an embodiment, the processor 120 may receive the recommendation recipient's consumption information by using the first neural network 121, which has completed training, and the second neural network 123, which has completed training, and output item recommendation information to which metadata consumption information is reflected.

According to an embodiment, the recommendation recipient's consumption information may include at least one of item consumption information representing the recommendation recipient's item viewing history, etc., and metadata preference information set by the recommendation recipient.

According to an embodiment, the processor 120 may receive, with respect to a user having no item consumption history, that is, a cold start user, information about metadata preferred by the user, and recommend an item to which the information about the metadata preferred by the user is reflected for the cold start user.

According to an embodiment, when a recommendation recipient inputs preference information for M (M is a natural number that is less than N) pieces of metadata among N pieces of metadata, the processor 120 may activate M neural networks among the N neural networks included in the second neural network 123. In this case, the processor 120 may obtain item recommendation information to which consumption information about the M pieces of metadata is reflected.

According to an embodiment, the processor 120 may activate only the M neural networks by setting an edge value entering an embedding node except for embedding nodes of the M neural networks among embedding nodes of the N neural networks, to 0.

According to an embodiment, the processor 120 may activating only the M neural networks by mapping the embedding nodes of the M neural networks among the embedding nodes of the N neural networks to new nodes having an edge value of 1 and mapping the remaining embedding nodes to other new nodes having an edge value of 0.

As such, according to an embodiment, the processor 120 may cause item consumption information and a plurality of pieces of metadata consumption information corresponding to the item to be independently trained.

As such, according to an embodiment, the processor 120 may receive a recommendation receipt's metadata preference information, and activate only a neural network corresponding to metadata preferred by the recommendation recipient among a plurality of neural networks included in the second neural network 123 to output item information to which metadata information preferred by the recommendation recipient is reflected.

According to an embodiment, the processor 120 may recommend, with respect to a cold start user having no item consumption history, an item to which information about metadata preferred by the cold start user is reflected, for the cold start user.

Figure 3:
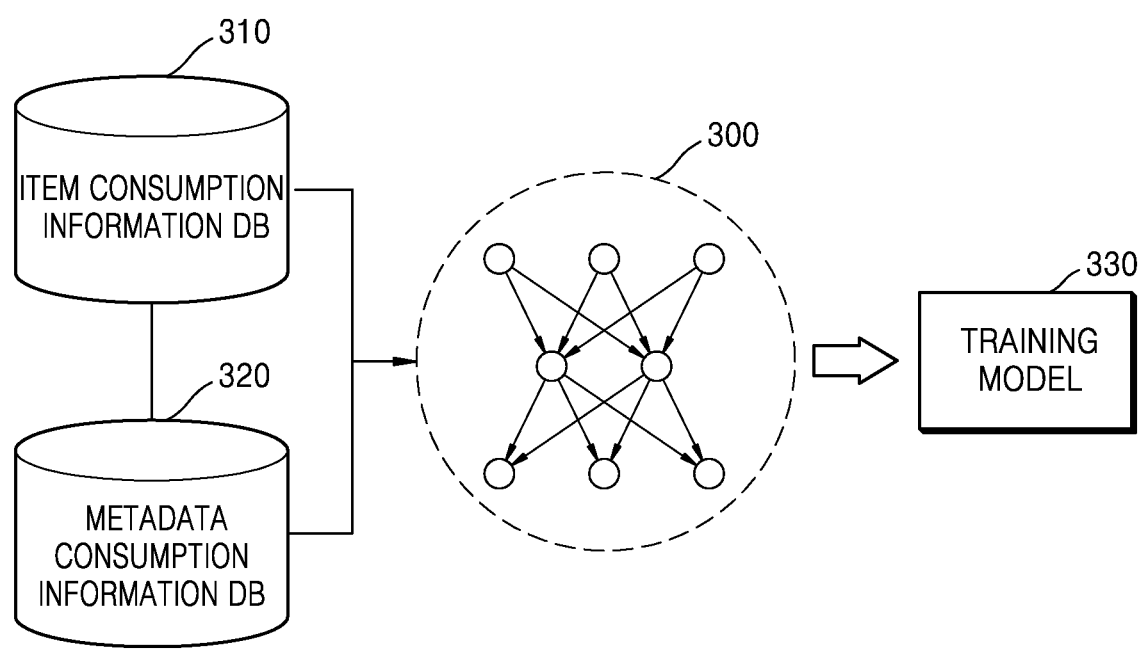
FIG. 3 is a view for describing a method, trained by a neural network 300, of obtaining recommendation item information from input data, according to an embodiment.

FIG. 3 is a view for describing a method, trained by a neural network 300, of obtaining recommendation item information from input data, according to an embodiment.

Referring to FIG. 3, when a plurality of pieces of training data are input, the neural network 300 may train a method of inferring a recommendation item from the plurality of pieces of training data, and generate a training model 330 based on the trained result.

According to an embodiment, the neural network 300 may obtain training data from an item consumption information database 310 and a metadata consumption information database 320, and obtain the training model 330 by using the training data as an input value.

According to an embodiment, the item consumption information database 310 may have stored information about a plurality of users' item consumption histories. For example, it may be assumed that a certain user has watched movies of numbers 1, 3, and 4 among five movies identified by numbers 1 to 5. When a case in which a user has consumed a movie is represented as 1 and a case in which the user has not consumed a movie is represented as 0, the user's item consumption information may be expressed as a vector such as [1, 0, 1, 1, 0] in an order of the numbers 1 to 5. When there are a plurality of users, information about item consumption histories for the individual users may be expressed in a form of a matrix into which vectors representing the item consumption histories for the individual users are combined. In this way, consumption information about a large number of items of a large number of users may have been stored in the item consumption information database 310.

According to an embodiment, the neural network 300 may be trained to classify input data by using, as input values, a plurality of users' item consumption information obtained from the item consumption information database 310, analyze the input data to extract a user's item consumption characteristic, and infer a new item to be recommended for the user based on the user's item consumption characteristic.

According to an embodiment, the metadata consumption information database 320 may have stored, in correspondence to a plurality of users' item consumption information, metadata information related to each item. For example, the metadata consumption information database 320 may have stored a table in which various kinds of metadata information representing attributes of items is mapped to the items. For example, with regard to an item being a movie, the metadata consumption information database 320 may have stored a table in which various metadata about the item, information, such as, for example, a director of the movie, a genre of the movie, a year of filming, the number of viewers, etc., is mapped to an identifier (ID) of the movie.

According to another embodiment, the metadata consumption information database 320 may have stored metadata consumption information corresponding to a user's item consumption history. For example, like the above-described example, in the case in which a user has watched movies of numbers 1, 3, and 4 among five movies of numbers 1 to 5, it may be assumed that only metadata about genres among various metadata is considered, and movie genres are simply classified into four genres, that is, drama, thriller, horror, and action. In the above-described example, it may be assumed that a genre of the movie of number 1 watched by the user is drama, a genre of the movie of number 3 is a combination of thriller and action, and a genre of the movie of number 4 is thriller. In this case, metadata consumption information corresponding to the user's item consumption history may be expressed as [1, 2, 0, 1] in an order of drama, thriller, horror, and action. That is, the user's metadata consumption information may be expressed as scores, such as 1 point for drama, 2 points for thriller, and 1 point for action, because the user has watched one drama movie, two thriller movies, and one action movie.

According to an embodiment, the neural network 300 may train a method of obtaining information about a plurality of users' metadata consumption histories from the metadata consumption information database 320, analyzing input data by using the information as input values, extracting a characteristic of metadata consumed by a user from the input data, and inferring a new item to be recommended for the user.

Herein, the training model 330 may be a trained neural network for obtaining a targeted result through a neural network. More particularly, by training the neural network 300 by using a plurality of pieces of training data, a plurality of weight values that are respectively applied to a plurality of nodes forming the neural network 300 may be set. Herein, the weight values mean connection strengths between the nodes of the neural network 300, and may be also referred to as edges. The weight values may be optimized through repetitive training, and may be repeatedly corrected until accuracy of results satisfies preset reliability. The training model 330 may be a neural network formed by finally set weight values.

According to an embodiment, an operation performed by at least one neural network 300 of training a method of inferring a recommendation item may be performed in advance before consumption information is received from a recommendation recipient. Also, when a part of a plurality of pieces of training data changes, the training model 330 may be updated. For example, when a user watches a new item, information about the item newly consumed by the user may be fed back to the neural network 300 to be used as training data. Also, information about items consumed by a plurality of users may be additionally received as training data in unit of a preset time period.

Likewise, when metadata consumption information of a plurality of users changes, for example, when a movie rating or the number of viewers changes, the changed metadata consumption information may be fed back to the neural network 300 to be used as training data. When new training data is added, at least one neural network 300 may again train a method of inferring a recommendation item from the training data, and accordingly, a training model may be updated.

Also, a method of inferring a recommendation item from training data by using at least one neural network 300 may be performed by a server, and according to some embodiments, the method may be performed by an image display (not shown). An operation of training a method of inferring a recommendation item from training data by using at least one neural network 300 may be relatively complex and require a large amount of computation. Accordingly, an external server may perform the training operation, and an image display may receive the training model 330 from the external server. In this case, an amount of computations that will be performed by the image display may be reduced. The image display may have received the training model 330 in advance from the external server and stored the training model 330 in a memory, and thereafter, the image display may infer a recommendation item by using the stored training model 330. According to another embodiment, the image display may transmit a recommendation recipient's consumption information to a server storing the training model 330 through a communication network, receive a result value of the training model 330 from the server, and output the result value of the training model 330.

Figure 4:
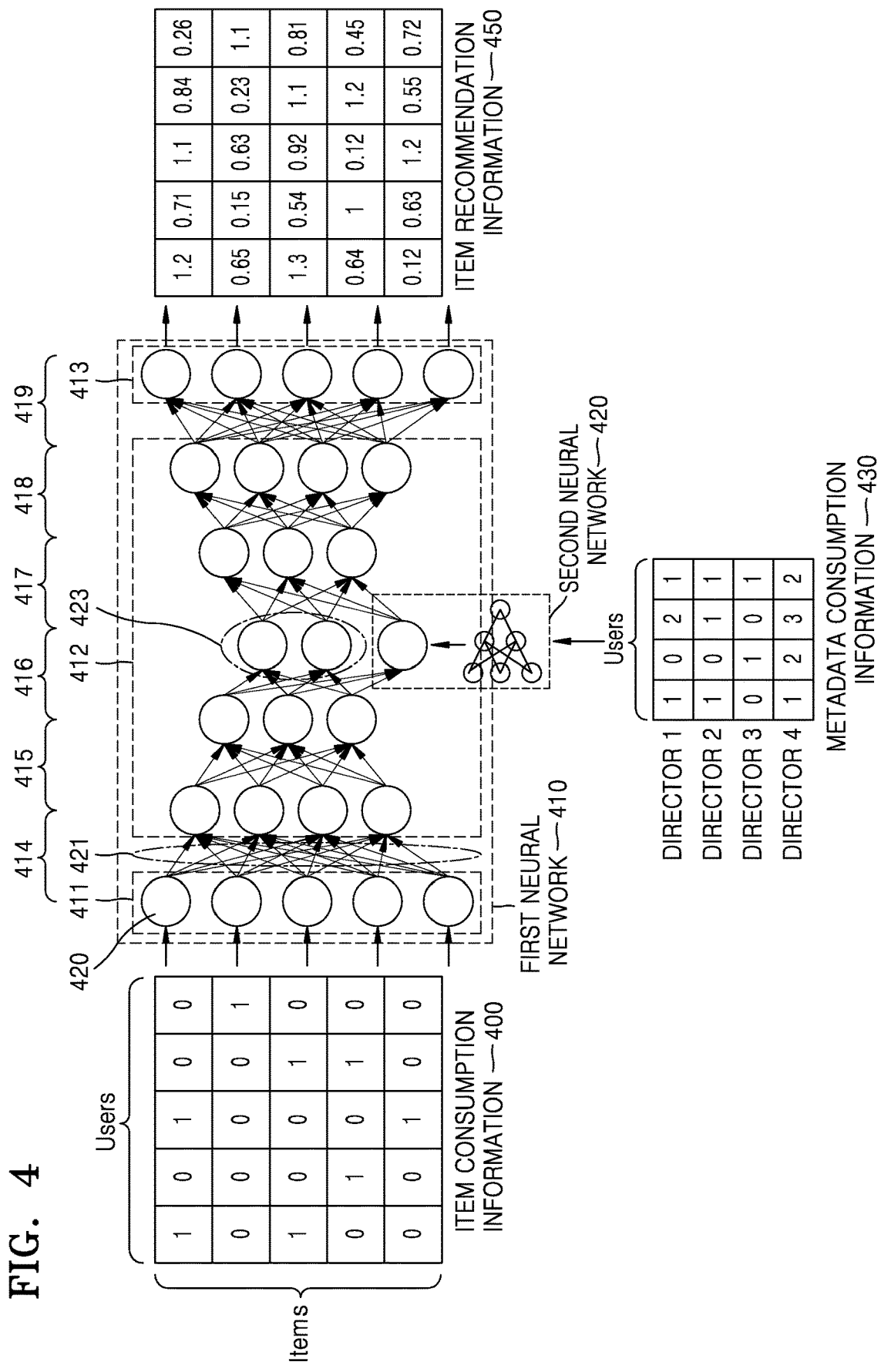
FIG. 4 is a view for describing that the computing device 100 according to an embodiment obtains item recommendation information to which metadata consumption information is reflected from a recommendation recipient's consumption information.

FIG. 4 is a view for describing that the computing device 100 according to an embodiment obtains item recommendation information to which metadata consumption information is reflected from a recommendation recipient's consumption information.

Referring to FIG. 4, the computing device 100 may use a first neural network 410 and a second neural network 420. The first neural network 410 and the second neural network 420 of FIG. 4 may perform the same functions as the first neural network 121 and the second neural network 123 of FIG. 2, although being assigned different reference numerals from those assigned to the first neural network 121 and the second neural network 123 of FIG. 2. Hereinafter, descriptions previously given above with respect to the first neural network 121 and the second neural network 123 of FIG. 2 are omitted.

The first neural network 410 may be a deep neural network (DNN) including two or more hidden layers. The first neural network 410 may include a structure that receives input data, processes the input data by passing the input data through the hidden layers, and outputs the processed data. The first neural network 410 may be an autoencoder model that reconstructs input data among DNNs. That is, the first neural network 410 may include an encoder that compresses a characteristic of input information to obtain a latent layer 423 located at a center of the model among the hidden layers, and a decoder that reconstructs the input information from the latent layer 423. In this case, the number of nodes included in an input layer 411 of the first neural network 410 may be equal to the number of nodes included in an output layer 413.

As shown in FIG. 4, the first neural network 410 may include the input layer 411, a hidden layer 412, and the output layer 413 to perform an operation for determining an item.

Item consumption information 440 of users may be input to the input layer 411 of the first neural network 410. The item consumption information 440 of users may be information about histories of a plurality of items consumed by a plurality of users for a preset time period.

The computing device 100 may obtain information about users' item consumption histories from the item consumption information database 310, the memory 110, etc. According to an embodiment, the computing device 100 may pre-process the obtained information to a format capable of being input to the input layer 411 of the first neural network 410. Alternatively, according to an embodiment, the computing device 100 may obtain information having a pre-processed format from the item consumption information database 310 or the memory 110. As shown in FIG. 4, the computing device 100 may obtain the item consumption information 440 in which a plurality of pieces of item consumption information for a plurality of users are represented in a matrix form, as one-hot vectors, through one-hot encoding, and input the one-hot vectors to the input layer 411 of the first neural network 410.

The first neural network 410 may be configured with a first layer (Layer 1) 414 formed between the input layer 411 and a first hidden layer (HIDDEN LAYER1), a second layer (Layer 2) 415 formed between the first hidden layer (HIDDEN LAYER1) and a second hidden layer (HIDDEN LAYER2), a third layer (Layer 3) 416 formed between the second hidden layer (HIDDEN LAYER2) and a third hidden layer (HIDDEN LAYER3), a fourth layer (Layer 4) 417 formed between the third hidden layer (HIDDEN LAYER3) and a fourth hidden layer (HIDDEN LAYER4), a fifth layer (Layer 5) 418 formed between the fourth hidden layer (HIDDEN LAYER4) and a fifth hidden layer (HIDDEN LAYER5), and a sixth layer (Layer 6) 419 formed between the fifth hidden layer (HIDDEN LAYER5) and an output layer (OUTPUT LAYER) 413. Herein, the third hidden layer (HIDDEN LAYER3) may be the latent layer 423 located at the center of the model among the hidden layers.

In FIG. 4, each of the plurality of layers forming the first neural network 410 may include at least one node. For example, the input layer 411 may include one or more nodes 420 for receiving data. The item consumption information 440 may be input to the one or more nodes 420 included in the input layer 411. Herein, nodes of two neighboring layers may be connected through a plurality of edges (for example, 421), as shown in FIG. 4. Each of the edges may include the corresponding weight value and operation information, such as multiplication, addition, etc. The first neural network 410 may multiply an input signal by a weight value of an edge or sum the input signal with the weight value of the edge to perform an operation, and output a result value of the operation as a node value of a next layer connected to the edge. The first neural network 410 may perform operations between the individual layers with respect to input data, and obtain result values of the operations as output data.

The first neural network 410 may analyze the item consumption information 440 being input data, perform an operation on the item consumption information 440, and output item recommendation information 450 as a result. The first neural network 410 may train a relationship between users to detect an interaction such as a similarity between the users, fill a matrix for content not consumed by the users based on the interaction, and output a result.

To raise the accuracy of the result output through the first neural network 410, the computing device 400 may repeatedly perform training in a direction from the output layer 413 to the input layer 411 based on a plurality of pieces of training data to correct weight values such that the accuracy of the output result is raised. That is, the first neural network 410 may continue to correct values of edges included in the hidden layer 412 to reduce an error between an output from the output layer 413 and an input to the input layer 411.

Through the output layer 413 of the first neural network 410, a result value having a vector form may be output. When a one-hot vector is output from the output layer 413, a plurality of one-hot vectors may be combined to obtain the item recommendation information 450.

Like the item consumption information 440, the item recommendation information 450 may be expressed in a form of a matrix in which scores for a plurality of items are represented according to a plurality of users. Because the first neural network 410 may predict a score for an item not consumed by a user according to a similarity with a similar user, even if the matrix of the item consumption information 440 has a value of 0, the matrix of the item recommendation information 450 may be filled with a non-zero value.

The first neural network 410 having weight values finally corrected after training may be used as a model for recommending an item for a user. Because the first neural network 410 determines weight values for the edges connecting the individual nodes during a training process, the first neural network 410 may perform, when an input enters the input layer 411 after training, a real-time operation on the input to deduce a result.

However, because the first neural network 410 has a fixed structure for outputting an output value that is similar to input data, the first neural network 410 may have difficulties in reflecting other information except for information about items. Accordingly, the first neural network 410 may have difficulties in obtaining a recommendation result satisfying personalization and diversity by reflecting a user's taste in metadata being attributes of an item, such as a genre, an actor, a director, etc.

For each item, there may be metadata representing attributes of each of the items. According to an embodiment, the computing device 100 may embed the second neural network 420 of training metadata consumption information into the hidden layer 423 of the first neural network 410 that has completed training, and cause the second neural network 420 to train metadata consumption information.

According to an embodiment, the computing device 100 may embed the second neural network 420 in the state of fixing edge values of the first neural network 410 to real numbers. By training the second neural network 420 after fixing the edge values of the first neural network 410, the first neural network 410 may be not influenced by the second neural network 420.

According to an embodiment, the second neural network 420 may include an embedding matrix and an embedding node that may be trained. The second neural network 420 may obtain metadata consumption information 431 corresponding to the item consumption information 440 from the metadata consumption information database 320, the memory 110, etc., and receive the metadata consumption information 431 as input data.

The metadata consumption information 431 may be information about metadata consumption histories corresponding to histories of a plurality of items consumed by a plurality of users for a preset time period. According to an embodiment, the computing device 100 may pre-process the obtained information to a format capable of being input to the second neural network 420. Alternatively, according to an embodiment, the computing device 100 may obtain information having a pre-processed format from the metadata consumption information database 320 or the memory 110.

The computing device 100 may input the item consumption information 440 and the metadata consumption information 431 to the first neural network 410 and the second neural network 420 embedded into the first neural network, and cause the item recommendation information 450 to be output, thereby training the second neural network 420.

More specifically, the computing device 100 may obtain the item consumption information 440 as one-hot vectors through one-hot encoding, and input the one-hot vectors to the input layer 411 of the first neural network 410. Simultaneously, the computing device 100 may obtain, as shown in FIG. 4, the metadata consumption information 431 represented in a matrix form, as one-hot vectors, through one-hot encoding, and input the one-hot vectors to the first neural network 410. The second neural network 420 may perform an operation on the input information and the embedding matrix, and represent a result of the operation as an embedding node. The embedding node of the second neural network 420 may be arranged in a line with base nodes included in the latent layer 423 of the first neural network 410 to be fully connected to nodes included in layers before and after the latent layer 423.

The computing device 100 may cause the item recommendation information 450 used to train the first neural network 410 to be output from the first neural network 410 having fixed edge values after training and the second neural network 420 embedded into the first neural network 410, thereby training the embedding nodes included in the second neural network 420 and values of the embedding matrix for obtaining the embedding nodes. At this time, because the edges included in the first neural network 410 are fixed and input and output data of the first neural network 410 is the same as those used to train the first neural network 410, values that are output from the embedding nodes of the second neural network 420 may be obtained. To obtain the values that are output from the embedding nodes, the embedding matrix may perform training.

According to an embodiment, the second neural network 420 may include N (N is a natural number that is greater than or equal to 2) neural networks for respectively training consumption information for individual pieces of metadata according to kinds of the metadata. In FIG. 4, the second neural network 420 is shown as a single neural network. However, the single neural network is an embodiment, and the second neural network 420 may include a plurality of neural networks. For example, the second neural network 420 may include three neural networks of separately training a composer, a lyricist, and a singer which are metadata corresponding to an item of music. In this case, the three neural networks included in the second neural network 420 may be independently trained. That is, the computing device 100 may embed an embedding node of one (for example, the neural network of a training composer among metadata) of the three neural networks included in the second neural network 420 into the latent layer 423 of the first neural network 410, thereby causing the neural network of a training composer to be trained. Thereafter, the computing device 100 may remove the embedding node of the neural network of training composer, embedded into the latent layer 423 of the first neural network 410, and embed an embedding node of the neural network of training lyricist among the three neural networks included in the second neural network 420, thereby causing the neural network of a training lyricist to be independently trained. Likewise, the computing device 100 may remove a node of another neural network, embedded into the latent layer 423 of the first neural network 410, and embed an embedding node of the neural network of training the remaining metadata, that is, a singer among the three neural networks included in the second neural network 420, thereby causing the neural network of a training singer to be independently trained.

As such, the computing device 100 may cause the plurality of neural networks included in the second neural network 420 to be independently trained, thereby minimizing an influence between metadata in obtaining item recommendation information.

Also, in this way, by causing neural networks to be independently trained according to kinds of individual pieces of metadata, the computing device 100 may obtain result values corresponding to a user's various queries, that is, desired metadata search requests, to provide results to which only the corresponding metadata information is reflected.

After the first neural network 410 and the N neural networks included in the second neural network 420 are independently trained, all embedded nodes respectively included in the N neural networks may be embedded in a line into the latent layer 423 of the first neural network 410 to be fully connected to the layers of the first neural network 410.

According to an embodiment, the computing device 100 may input a recommendation recipient's consumption information to the first neural network 410, which has completed training, and the second neural network 420, which has completed training, and obtain item recommendation information to which metadata consumption information is reflected from the first neural network and the second neural network. The computing device 100 may input the recommendation recipient's item consumption information to the first neural network 410 and input the recommendation recipient's metadata preference information to the second neural network 420.

The recommendation recipient's metadata preference information may be information about metadata preferred by the recommendation recipient, and may be information representing metadata preferred by the recommendation recipient for each kind of a plurality of pieces of metadata. For example, with regard to an item of movie, it may be assumed that N different pieces of metadata including genres, directors, ratings, filming locations, years of filming, etc. of the item exist. A recommendation recipient may input preferred information for desired metadata among a plurality of pieces of metadata or select a preferred target from among various information, through a user interface (not shown), etc. For example, it may be assumed that a recommendation recipient likes action movies among movie genres, movies having high ratings, and movies filmed in the U.S. as a filming location. In this case, the recommendation recipient may set, with respect to genres, ratings, and filming locations among a plurality of pieces of metadata, his/her preferred information, that is, an action genre, a rating of 4 points or higher out of 5 points, and a filming location of the U.S., as metadata preference information.

In the above-described example, when the recommendation recipient sets preference information only for three pieces of metadata, that is, genres, ratings, and filming locations, which are some of the N pieces of metadata, the second neural network 420 may activate only three neural networks that have trained genres, ratings, and filming locations among the N neural networks. In this case, the computing device 100 may output an item obtained considering genres, ratings, and filming locations from the first neural network 410 and the second neural network 420, as recommendation information. That is, the computing device 100 may sum a result value obtained by inputting the item consumption information 440 with a result value obtained by inputting metadata consumption histories for genres, ratings, and filming locations to obtain the item recommendation information 450.

As such, according to an embodiment, the computing device 100 may activate some neural networks among the second neural network 420 embedded into the first neural network 410 according to a recommendation recipient's setting, and deactivate the remaining neural networks. Accordingly, all users may use personalized preference information to which their preferred metadata information is reflected, by using a trained recommendation model.

According to an embodiment, to activate only the three neural networks among the N neural networks, the second neural network 420 may set edge values entering embedding nodes of neural networks not selected by the recommendation recipient among the N neural networks to 0, without changing edge values entering embedding nodes of the three neural networks. According to another embodiment, the second neural network 420 may map the embedding nodes of the N neural networks to new nodes (not shown) each having a value of 1 or 0, thereby activating some neural networks. That is, the second neural network 420 may map the embedding nodes of the three neural networks among the embedding nodes of the N neural networks to new nodes having an edge value of 1, and map the remaining embedding nodes to other new nodes having an edge value of 0, thereby activating only the three neural networks.

As such, according to an embodiment, the computing device 100 may reflect, when outputting item recommendation information, information about metadata corresponding to the item to the item recommendation information, thereby obtaining item recommendation information having reliability and matching with a user's preference.

Also, according to an embodiment, the computing device 100 may obtain, only with respect to metadata preferred by a recommendation recipient among a plurality of pieces of metadata, item recommendation information to which a consumption history of the metadata is reflected, so that each user may use a personalized result.

Figure 5:
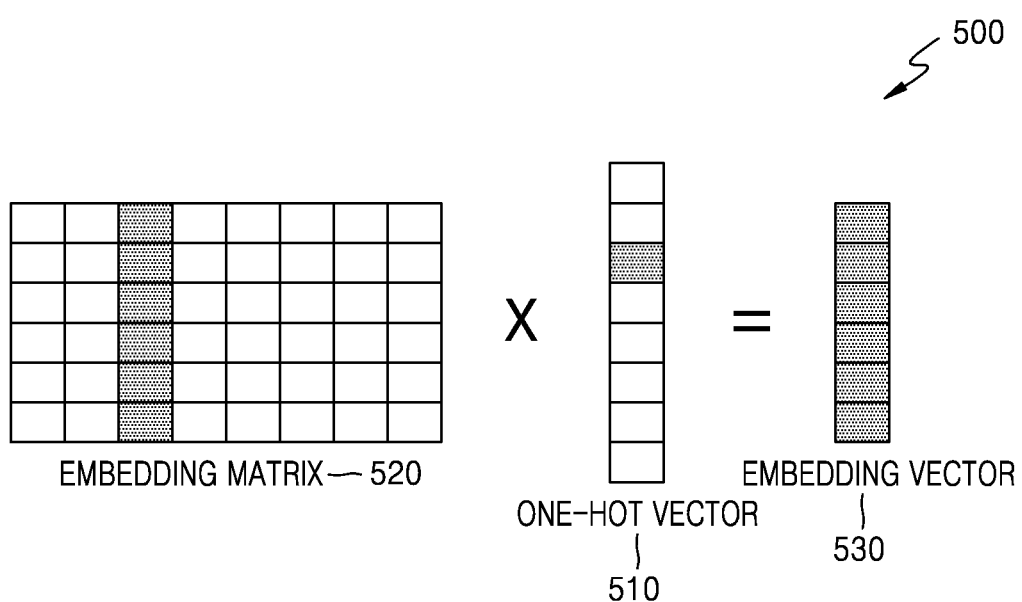
FIG. 5 is a view for describing a second neural network 500 according to an embodiment.

FIG. 5 is a view for describing a second neural network 500 according to an embodiment. Referring to FIG. 5, the second neural network 500 may include a one-hot vector 510 representing metadata consumption information, an embedding matrix 520, and an embedding vector 530 obtained through an operation of the one-hot vector 510 and the embedding matrix 520.

The one-hot vector 510 may be a vector representing the metadata consumption information 431. The one-hot vector 510 may be a vector obtained through one-hot encoding, and may be a vector in which an index value of information to need to be expressed is 1 and the remaining indexes are expressed as 0. As shown in FIG. 5, the one-hot vector 510 may be a vector of H*1, which includes, as information, a value of a specific piece of metadata among H pieces of metadata and includes information about the remaining pieces of metadata as a value of 0. In FIG. 5, the one-hot vector 510 is shown, which represents a user's metadata consumption information. However, when there are a plurality of users, the plurality of users' metadata consumption information may be combined and used.

The one-hot vector 510 may be operated with the embedding matrix 520. The embedding matrix 520 may be used in deep learning and train values. The embedding matrix 520 may be trained to obtain a value of a desired embedding node. When V is a size of the embedding vector 530 and H is the number of pieces of metadata, the embedding matrix 520 may be expressed as V*H. Because the embedding matrix 520 is a V*H matrix and the one-hot vector 510 is a H*1 vector, the embedding matrix 520 may be operated with the one-hot vector 510 so that the embedding vector 530 of V*1 may be obtained.

A dimension of the embedding vector 530 may be adjusted through an operation. According to an embodiment, the number of embedding nodes may be determined as the number of embedding nodes of when the computing device 100 outputs a most appropriate result value. For example, as shown in FIG. 5, when the embedding vector 530 is a vector of 6*1 and the number of embedding nodes is 2, the embedding vector 530 of 6*1 may be mapped to a desired dimension, that is, two embedding nodes, through one or a plurality of hidden layers (not shown).

The embedding nodes may be connected in a line to the latent layer 423 of the first neural network 410 to be embedded into the first neural network 410, as described above with reference to FIG. 4.

As described above, after an embedding node is embedded into the first neural network 410 that has completed training, when the item consumption information 440 of the user is input to the first neural network 410 and the one-hot vector 510 corresponding to the metadata consumption information 431 is input to an embedding node of the second neural network 420 to cause a one-hot vector corresponding to the item recommendation information 450 to be output from the first neural network 410, a value that needs to be output from the embedding node of the second neural network 420 may be obtained because the first neural network 410 has an edge value of a fixed real value. To cause a value output from the embedding node to have the obtained value, values of the embedding matrix 520 may be trained. To increase the accuracy of a value output from the embedding node through the embedding matrix 520, the second neural network 500 may repeatedly perform training based on training data. The values of the embedding matrix 520 may be repeatedly corrected through the repetitive training to raise the accuracy of output results. The second neural network 420 may include the embedding matrix 530 having finally set values.

When the second neural network 420 includes N neural networks which have independently trained consumption information about various kinds of metadata for items, values of an embedding matrix for each of the N neural networks may be independently trained according to the above-described method.

Figure 6:
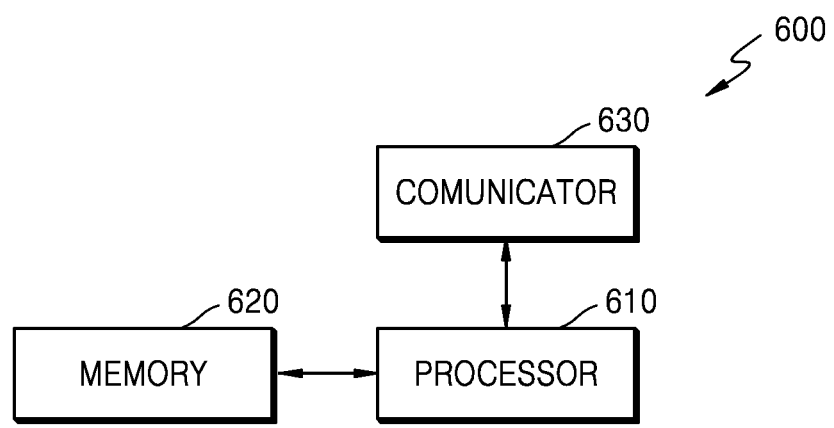
FIG. 6 is an internal block diagram of a computing device 600 according to an embodiment.

FIG. 6 is an internal block diagram of a computing device 600 according to an embodiment.

The computing device 600 of FIG. 6 may include a processor 610, a memory 620, and a communicator 630. The computing device 600 of FIG. 6 may be a device including the computing device 100 of FIG. 1. Hereinafter, the processor 610 and the memory 620 included in the computing device 600 of FIG. 6 may perform the same functions as those of the processor 110 and the memory 120 included in the computing device 100 of FIG. 1, and accordingly, repeated descriptions thereof are omitted.

The processor 610 may control overall operations of the computing device 600. The processor 610 may execute one or more instructions stored in the memory 610 to control the computing device 600 to perform functions.

According to an embodiment, the processor 610 may execute one or more instructions to receive a recommendation recipient's consumption information and obtain item recommendation information to which metadata consumption information is reflected. The processor 610 may obtain item recommendation information to which metadata consumption information is reflected, by using a first neural network trained to receive a user's item consumption information and reconstruct the user's consumption information and a second neural network embedded into the first neural network and having been trained with respect to metadata consumption information corresponding to the item consumption information.

According to an embodiment, the second neural network may include N neural networks which have independently trained consumption information for N (N is a natural number that is greater than or equal to 2) different pieces of metadata.

According to an embodiment, each of the N neural networks may include an embedding node, and embedding nodes of the N neural networks may be embedded into a latent layer of the first neural network.

According to an embodiment, when metadata preferred by a user is M pieces (M is a natural number that is less than N), the processor 610 may activate only M neural networks among the N neural networks included in the second neural network to obtain item recommendation information to which M pieces of metadata consumption information is reflected.

According to an embodiment, the processor 610 may activate only the M neural networks by setting edge values entering embedding nodes except for embedding nodes of the M neural networks among the embedding nodes of the N neural networks, to 0.

According to an embodiment, the processor 610 may activate only the M neural networks by mapping only the embedding nodes of the M neural networks among the embedding nodes of the N neural networks to new nodes having an edge value of 1, and mapping the remaining embedding nodes to other new nodes having an edge value of 0.

The computing device 600 of FIG. 6 may include the communicator 630, in addition to the processor 610 and the memory 620. The communicator 630 according to an embodiment may transmit and receive signals by communicating with an external device connected through a wired or wireless network under a control of the processor 610.

According to an embodiment, the communicator 630 may transmit/receive data to/from a external user equipment (UE) (not shown). The UE may include an electronic device, such as a television or a cellular phone, through which a recommendation recipient may input consumption information. According to an embodiment, the communicator 630 may receive a recommendation recipient's consumption information from a UE. The processor 610 may obtain at least one of item consumption information and metadata preference information included in the consumption information, and obtain item recommendation information to which the metadata preference information is reflected by using the obtained information. The processor 610 may transmit the item recommendation information to which the metadata preference information is reflected to the UE through the communicator 630.

The communicator 630 may include at least one communication module, such as a short-range communication module, a wired communication model, a mobile communication model, a broadcasting receiving module, etc. The communication module may include a tuner for receiving broadcasts, and a communication module capable of performing data transmission/reception through a network based on a communication standard, such as Bluetooth, wireless local area network (WLAN), wireless-fidelity (Wi-Fi), wireless broadband (Wibro), World Interoperability for Microwave Access (Wimax), code division multiple access (CDMA), and wideband code division multiple access (WCDMA).

Figure 7:
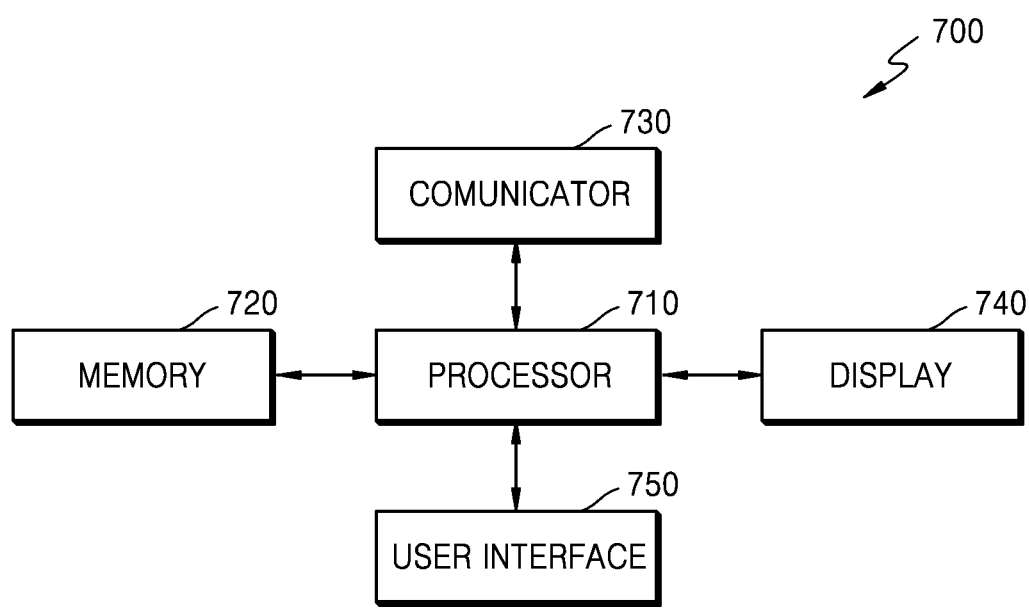
FIG. 7 is an internal block diagram of an image display 700 according to an embodiment.

FIG. 7 is an internal block diagram of an image display 700 according to an embodiment.

Referring to FIG. 7, the image display 700 may include a processor 710, a memory 720, a communicator 730, a display 740, and a user interface 750.

The image display 700 of FIG. 7 may be a device including the computing device of FIG. 6. The processor 710, the memory 720, and the communicator 730 included in the image display 700 of FIG. 7 may perform the same functions as those of the processor 110, the memory 120, and the communicator 730 included in the computing device 600 of FIG. 6, and accordingly, repeated descriptions thereof are omitted.

According to an embodiment, the image display 700 of FIG. 7 may receive, like the computing device 600 of FIG. 6, a recommendation recipient's consumption information from an external UE (not shown) through the communicator 730, obtain item recommendation information to which metadata preference information is reflected, and transmit the item recommendation information to the external UE through the communicator 730. In addition to the above-described function, the image display 700 of FIG. 7 may further perform, unlike the computing device 600 of FIG. 6, a function of receiving a recommendation recipient's consumption information from a user using the image display 700 through the user interface 750, and outputting the recommendation recipient's consumption information for the recommendation recipient through the display 740.

The image display 700 may be one of various types of electronic devices capable of outputting images, and may be a fixed type or a mobile type. For example, the image display 700 may include at least one of a desktop computer, a digital TV, a smartphone, a tablet personal computer (PC), a mobile phone, a video phone, an e-book reader, a laptop personal computer (PC), a netbook computer, a digital camera, personal digital assistants (PDA), a portable multimedia player (PMP), a camcorder, a navigation system, a wearable device, a smart watch, a home network system, a security system, and medical equipment.

According to an embodiment, the processor 710 may receive a query requesting searching of preset metadata from a user, and obtain a recommendation result corresponding to the query in response to the query. That is, the processor 710 may reflect information about metadata requested by a user to item recommendation information to obtain item recommendation information.

According to an embodiment, the communicator 730 may transmit and receive signals by communicating with an external device connected through a wired or wireless network under a control of the processor 710. The external device may be a content supplying server for supplying content to be output through the display 740, a broadcasting server, an electronic device, etc., or may be an information storage medium such as a universal serial bus (USB). Also, the external device may be a server, a server system, a server-based device, etc., which transmits/receives data to/from the communicator 730 to process the data.

The display 740 according to an embodiment may display an item received from a broadcasting station, an external server, an external storage medium, etc. on a screen. The item may include, as a media signal, one or more of a video signal, an audio signal, and a text signal.

According to an embodiment, the display 740 may output a screen for enabling a user to select metadata. For example, the display 740 may output a screen including a metadata setting button, etc.

According to an embodiment, the display 740 may output item recommendation information to which metadata consumption information is reflected.

When the display 740 is implemented as a touch screen, the display 740 may be used as an input device, as well as an output device. For example, the display 740 may include at least one of a liquid crystal display, a thin film transistor-liquid crystal display, an organic light-emitting diode, a flexible display, a 3Dimensional (3D) display, and an electrophoretic display. Also, according to an implementation type of the image display 700, the image display 700 may include two or more displays 740.

The user interface 750 according to an embodiment may receive a user input for controlling the image display 700. The user interface 750 may include various types of user input devices including a touch panel for sensing a user's touch, a button for receiving a user's push operation, a wheel for receiving a user's rotation operation, a key board, a dome switch, a microphone for voice recognition, a motion sensor for sensing motions, etc., although not limited thereto. Also, when the image display 700 is controlled by a remote controller (not shown), the user interface 750 may receive control signals from the remote controller.

According to an embodiment, a user may control the image display 700 through the user interface 750 to perform various functions of the image display 700. For example, the user may watch a specific movie on the image display 700 by using the user interface 750.

According to an embodiment, the user may search for a desired kind of metadata in various metadata by using the user interface 750. The user may select or input a desired category from among sub categories included in the searched metadata by using the user interface 750. For example, before the user receives a recommendation for a movie, the user may set metadata of a movie for which he/she wants to receive a recommendation, through the user interface 750.

For example, when a user wants to receive a recommendation for a movie of which a genre is action and which has a rating of 4 points or higher out of 5 points, the user may use the user interface 750 to search for metadata for genres in the various metadata and select a desired genre from among various sub categories, for example, thriller, action, and drama, belonging to the genres. Similarly, the user may search for metadata for ratings in the various metadata and select a category of 4 points or higher from among sub categories, for example, 3 points or less, 3 points to 4 points, 4 points or less, 4 points or higher, etc., belonging to the ratings.

The processor 710 may reflect information about the metadata set by the user to item recommendation information to obtain item recommendation information. That is, the processor 710 may output, for the user, an item obtained by reflecting a recommendation recipient's preference information for movies of which genres are action and which have ratings of 4 points or higher to recommendation results.

Figure 8:
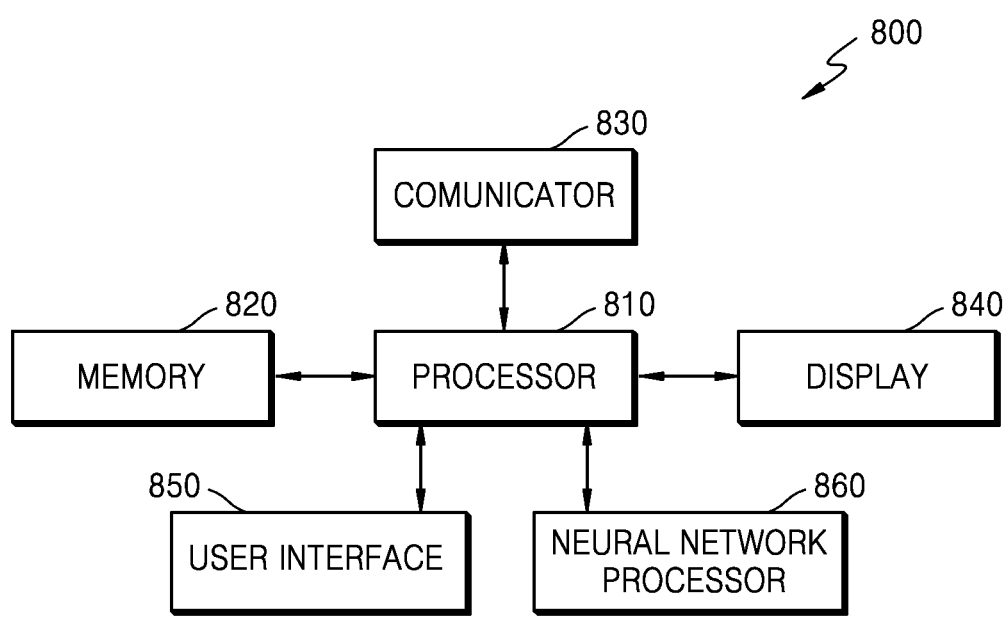
FIG. 8 is an internal block diagram of an image display 800 according to an embodiment.

FIG. 8 is an internal block diagram of an image display 800 according to an embodiment.

Referring to FIG. 8, the image display 800 of FIG. 8 may include a processor 810, a memory 820, a communicator 830, a display 840, a user interface 850, and a neural network processor 860.

The memory 820, the communicator 830, the display 840, and the user interface 850 included in the image display 800 of FIG. 8 may perform the same functions as the memory 720, the communicator 730, the display 740, and the user interface 750 included in the image display 700 of FIG. 7, and accordingly, repeated descriptions thereof are omitted.

The image display 800 shown in FIG. 8 may further include the neural network processor 860, compared with the image display 700 shown in FIG. 7. That is, the image display 800 of FIG. 8 may perform functions that are performed by the computing device 100 through the neural network processor 860, instead of the processor 810, unlike the image display 700 of FIG. 7.

The processor 810 may control overall operations of the image display 800. The processor 810 may execute one or more instructions stored in the memory 820 to cause the image display 800 to perform functions.

According to an embodiment, the neural network processor 860 may perform operations through a neural network. The neural network processor 860 may execute one or more instructions to perform operations through the neural network.

According to an embodiment, the neural network processor 860 may perform functions that are performed by the computing device 100 described above with reference to FIG. 1. According to an embodiment, the neural network processor 860 may execute one or more instructions stored in the memory 820 to receive a recommendation recipient's consumption information and obtain item recommendation information to which metadata consumption information is reflected.

The neural network processor 860 may be an algorithm that obtains recommendation information based on a similarity pattern from data trained in advance.

According to an embodiment, the neural network processor 860 may have trained, before receiving the recommendation recipient's consumption information, a user's item consumption information in advance. The neural network processor 860 may determine a similarity between the recommendation recipient and other users by using the recommendation recipient's item consumption information, based on training data obtained by collecting and analyzing a plurality of users' item consumption information, and recommend an item for the recommendation recipient according to the similarity.

According to an embodiment, the neural network processor 860 may have trained a user's metadata consumption information in advance. The neural network processor 860 may train training data resulting from collecting and analyzing metadata consumption information corresponding to a plurality of users' item consumption information.

According to an embodiment, the neural network 860 may again train the plurality of users' item consumption information and metadata consumption information corresponding to the plurality of users' item consumption information at regular time intervals to thereby update the training data.

According to an embodiment, the neural network processor 860 may receive a query requesting searching of preset metadata from a user, and reflect information about the preset metadata to item recommendation information to obtain item recommendation information.

Figure 9:
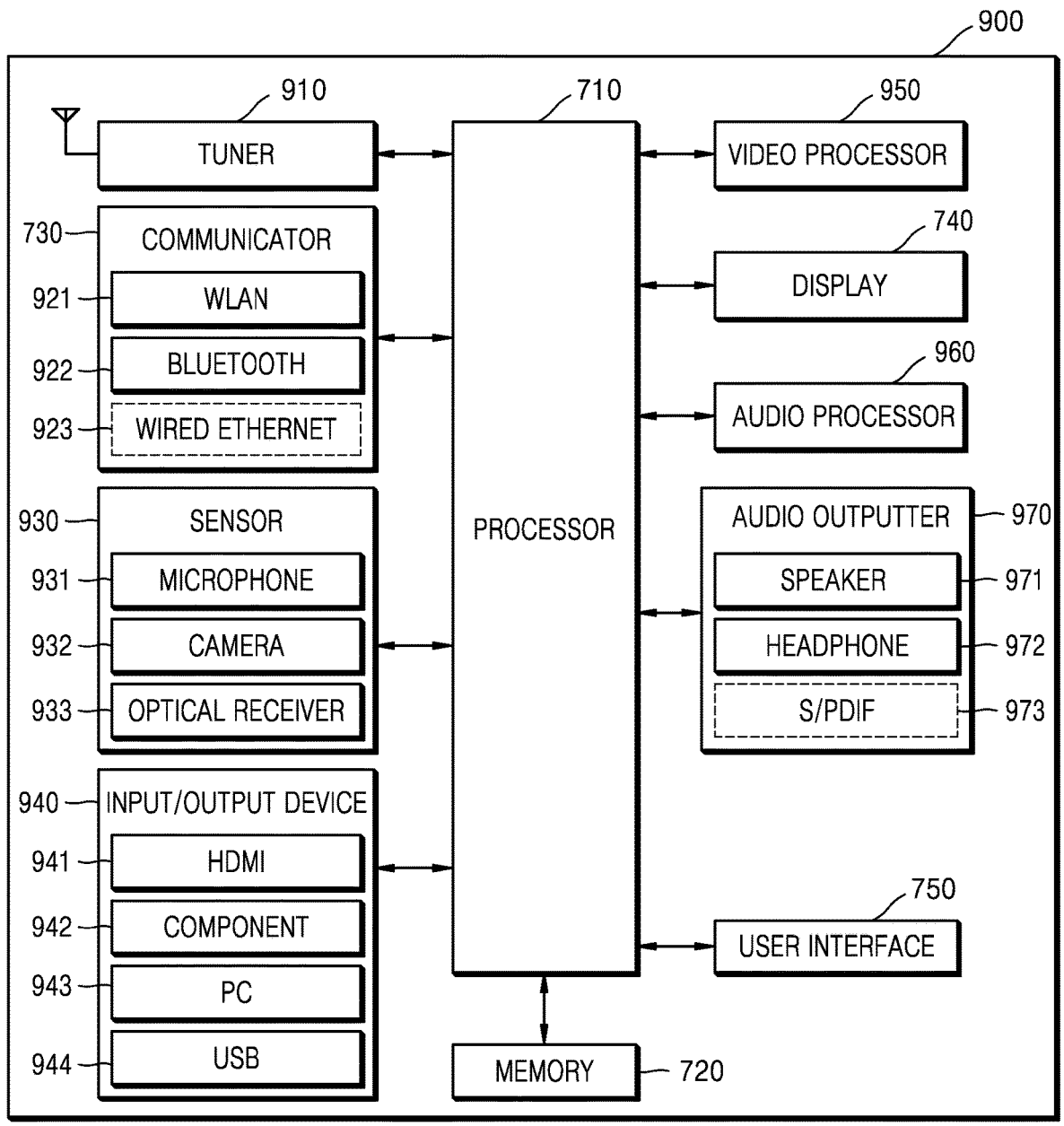
FIG. 9 is an internal block diagram of an image display 900 according to an embodiment.

FIG. 9 is an internal block diagram of an image display 900 according to an embodiment. Referring to FIG. 9, the image display 900 may further include a processor 710, the memory 720, the communicator 730, the display 740, the user interface 750, a tuner 910, a sensor 930, an input/output device 940, a video processor 950, an audio processor 960, and an audio outputter 970.

The image display 900 of FIG. 9 may include the components of the image display 700 of FIG. 7. Accordingly, descriptions overlapping with those described above with respect to the processor 710, the memory 720, the communicator 730, the display 740, and the user interface 750 will be omitted. Also, in FIG. 9, the term "processor 710", instead of "processor 710", is used, however, the processor 710 of FIG. 9 is denoted by the same reference numeral as the processor 710 because the processor 710 of FIG. 9 performs the same functions as the processor 710 of FIG. 7.

The tuner 910 may tune and select only a frequency of a channel which the image display 900 attempts to receive, from among many electromagnetic wave components, through amplification, mixing, resonance, etc. of broadcasting content, etc. received in a wired or wireless fashion. Content received through the tuner 910 may be decoded (for example, audio decoding, video decoding, or additional information decoding) to be split into audio, video, and/or additional information. The split audio, video, and/or additional information may be stored in the memory 720 by a control of the processor 710.

The communicator 730 may include at least one communication module, such as a short-range communication module, a wired communication module, a mobile communication module, a broadcast reception module, etc. Herein, the at least one communication module may include a tuner for receiving broadcasts, and a communication module capable of performing data transmission/reception through a network based on a communication standard, such as Bluetooth, WLAN, Wi-Fi, Wibro, Wimax, CDMA, and WCDMA.

The communicator 730 may connect the image display 900 to an external device or a server by a control of the processor 710. The image display 900 may download a program or application required by the image display 900 from the external device, the server, etc., or perform web-browsing, through the communicator 730.

The communicator 730 may include one of a wireless LAN 921, Bluetooth 922, and a wired Ethernet 923 to correspond to a performance and structure of the image display 900. Also, the communicator 730 may include a combination of the wireless LAN 921, the Bluetooth 922, and the wired Ethernet 923. The communicator 730 may receive a control signal through a control device such as a remote controller by a control of the processor 710. The control signal may be implemented as a Bluetooth type, a radio frequency (RF) signal type, or a Wi-Fi type. The communicator 730 may further include another short-range communication (for example, near field communication (NFC, not shown) or a Bluetooth low energy (BLE, not shown)), in addition to the Bluetooth 922. According to an embodiment, the communicator 730 may transmit/receive a connection signal to/from an external device, etc. through short-range communication, such as the Bluetooth 922 or BLE.

The sensor 930 may sense a user's voice, a user's image, or a user's interaction, and may include a microphone 931, a camera 932, and an optical receiver 933. The microphone 931 may receive a voice uttered by a user, convert the received voice into an electrical signal, and output the electrical signal to the processor 710.

The camera 932 may include a sensor (not shown) and a lens (not shown), and photograph an image formed on a screen.

The optical receiver 933 may receive an optical signal (including a control signal). The optical receiver 933 may receive an optical signal corresponding to a user input (for example, a touch, pressing, a touch gesture, a voice, or a motion) from a control device (not shown), such as a remote controller or a cellular phone. A control signal may be extracted from the received optical signal by a control of the processor 710.

The input/output device 940 may receive video (for example, a moving image signal or a still image signal), audio (for example, a voice signal or a music signal), additional information (for example, a description about content, a content title, or a content storage location), etc. from a database, a server, etc. located outside the image display 900 by a control of the processor 710. Herein, the additional information may include metadata for an item.

The input/output device 940 may include one of a High-Definition Multimedia Interface (HDMI) port 941, a component jack 942, a PC port 943, and a USB port 944. The input/output device 940 may include a combination of the HDMI port 941, the component jack 942, the PC port 943, and the USB port 944.

The video processor 950 may process image data to be displayed by the display 730, and perform various image processing operations, such as decoding, scaling, noise filtering, frame rate conversion, resolution conversion, etc., on the image data.

The audio processor 960 may process audio data. The audio processor 960 may perform various processing, such as decoding, amplification, noise filtering, etc., on the audio data.

The audio outputter 970 may output audio included in content received through the tuner 910, audio input through the communicator 730 or the input/output device 940, or audio stored in the memory 720, by a control of the processor 710. The audio outputter 970 may include at least one of a speaker 971, a headphone output terminal 972, or a Sony/Philips Digital Interface (S/PDIF) output terminal 973.

Figure 10:
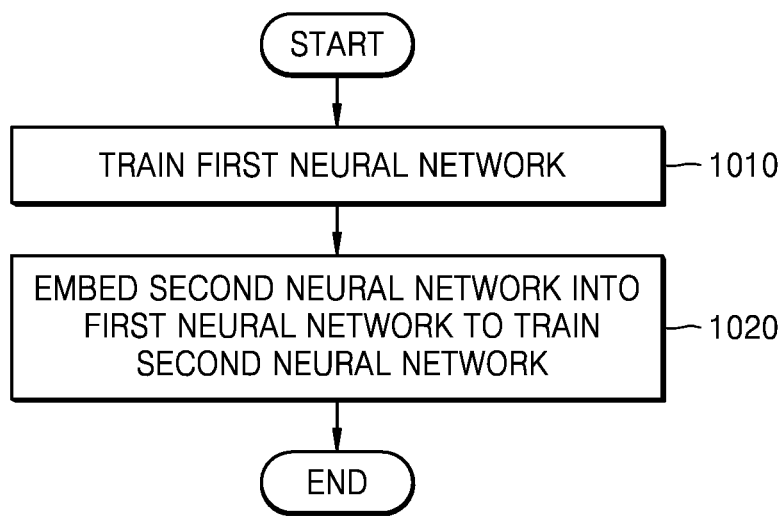
FIG. 10 is a flowchart illustrating a method of training a neural network according to an embodiment.

FIG. 10 is a flowchart illustrating a method of training a neural network according to an embodiment. Referring to FIG. 10, the computing device 100 may receive a user's item consumption information from the item consumption information database 310, etc., and input the user's item consumption information to a first neural network. The first neural network may be a collaborative filtering model using an auto-encoder model through deep training. The first neural network may be trained to compress input information and then reconstruct the input information, in operation 1010. The first neural network may be trained by reducing a dimension of a user's item consumption information, while compressing the user's item consumption information to obtain a latent layer, and decoding the latent layer to restore original data.

After training of the first neural network is completed, that is, when edge values of the first neural network have fixed real values, the computing device 100 may embed a second neural network into the latent layer of the first neural network to train the second neural network, in operation 1020.

The computing device 100 may obtain the user's metadata consumption information from the metadata consumption information database 320, etc. The computing device 100 may input the user's item consumption information and metadata consumption information corresponding to the user's item consumption information to the first neural network and the second neural network embedded into the first neural network, and train the second neural network such that reconstructed information is output from the first neural network based on the user's item consumption information and the metadata consumption information.

The second neural network may include a plurality of neural networks according to kinds of a plurality of pieces of metadata. In this case, the computing device 100 may independently embed embedding nodes of the plurality of neural networks into the latent layer of the first neural network to train the respective neural networks.

Figure 11:
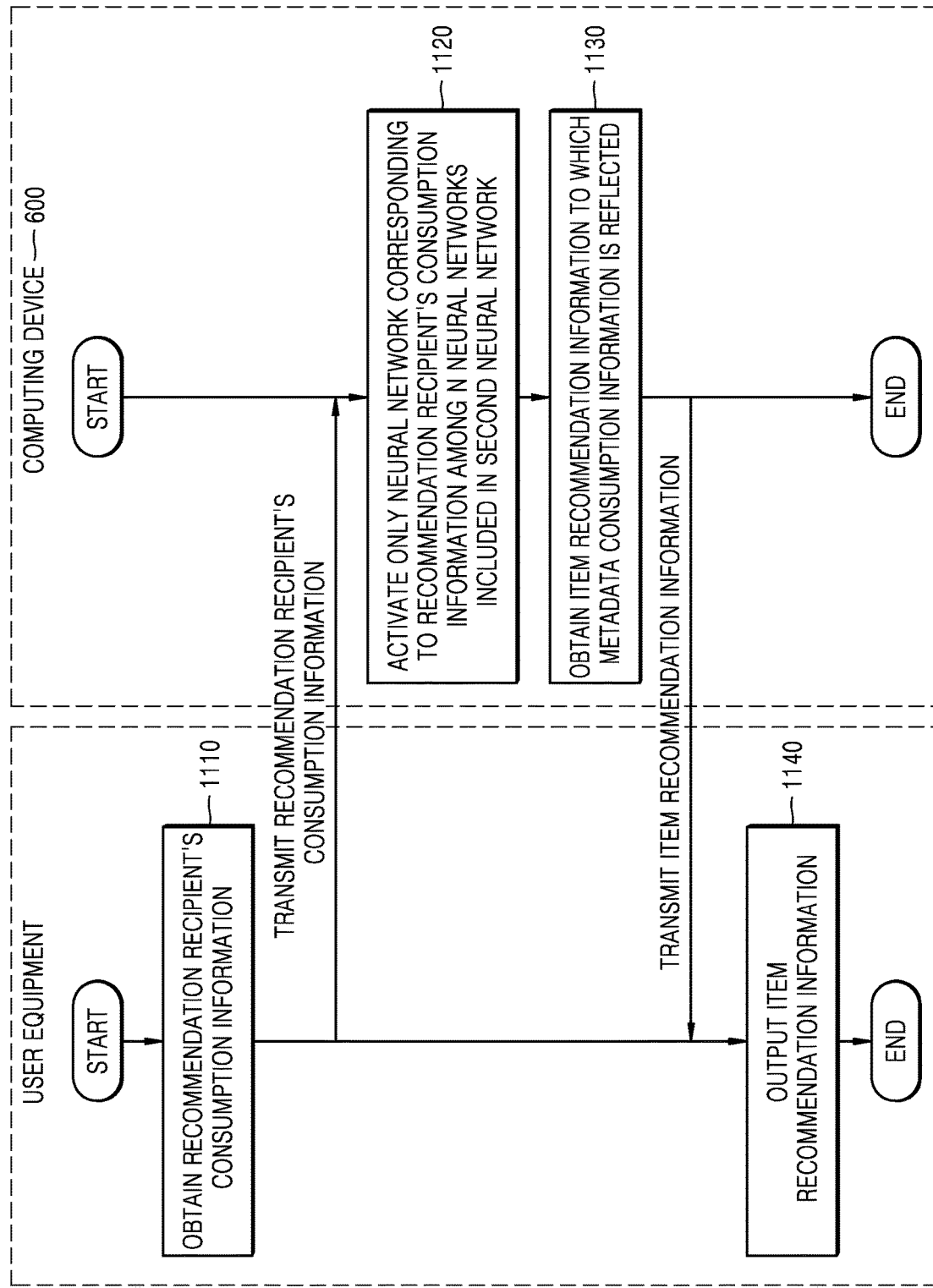
FIG. 11 is a flowchart illustrating a method, performed by the computing device 600 of FIG. 6, of transmitting item recommendation information to an external user equipment, according to an embodiment.

FIG. 11 is a flowchart illustrating a method, performed by the computing device 600 of FIG. 6, of transmitting item recommendation information to an external UE, according to an embodiment. Referring to FIG. 11, the computing device 600 may transmit/receive data to/from a UE through a communicator 630.

The UE may be an electronic device, such as a television or a cellular phone, to enable a recommendation recipient to input information and output information corresponding to the information.

In FIG. 11, the UE may obtain the recommendation recipient's consumption information, in operation 1110. According to an embodiment, the recommendation recipient's consumption information may include at least one of the recommendation recipient' item consumption information and metadata preference information. The UE may transmit the recommendation recipient's consumption information to the computing device 600.

The computing device 600 may receive the recommendation recipient's consumption information from the UE, and obtain item recommendation information by using a first neural network and a second neural network, which have completed training. When the second neural network includes N neural networks, which have trained consumption information for N pieces of metadata, the computing device 600 may activate only a neural network corresponding to the recommendation recipient's consumption information among the N neural networks included in the second neural network, in operation 1120. For example, when metadata preference information included in the recommendation recipient's consumption information is M pieces (M is a natural number that is less than N), the computing device 600 may activate only M neural networks included in the first neural network and the second neural network.

The computing device 600 may obtain item recommendation information to which the metadata consumption information is reflected, in operation 1130, and transmit the item recommendation information to the UE. The item recommendation information to which the metadata consumption information is reflected may be information about an item to which information about the M pieces of metadata selected by the recommendation recipient is reflected.

The UE may output the item recommendation information received from the computing device 600, in operation 1140.

Figure 12:
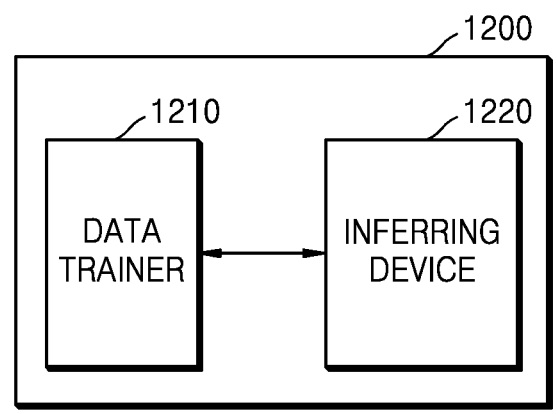
FIG. 12 is a block diagram illustrating a configuration of a computing device 1200 according to another embodiment.

FIG. 12 is a block diagram illustrating a configuration of a computing device 1200 according to another embodiment.

Referring to FIG. 12, the computing device 1200 may include a data trainer 1210 and an inferring device 1220.

The data trainer 1210 may obtain data to be used for training, and apply the obtained data to the inferring device 1220 which will be described later to train criterion for determining an item to which metadata consumption information is reflected.

The data trainer 1210 may have trained a user's item consumption history, a correlation between items, a similarity to other users' item consumption histories, etc., in advance. The data trainer 1210 may have trained metadata consumption information corresponding to the user's item consumption history, correlations between items and metadata, etc. in advance. Also, the data trainer 1210 may train criterion for inferring a recommendation item by using consumption information. Also, the data trainer 1210 may train criterion for inferring an item to which metadata consumption information is reflected by using consumption information.

The inferring device 1220 may infer a user's preference information from consumption information by using a trained model. The inferring device 1220 may infer the user's preference information according to preset criterion by training. Also, the inferring device 1220 may infer a recommendation item candidate matching with the user's preference from the consumption information by using the trained model.

The inferring device 1220 may infer item information matching with the user's metadata consumption information, based on information about a correlation between the metadata consumption information and an item. According to an embodiment, the data trainer 1210 may have trained the information about the correlation between the metadata consumption information and the item in advance.

An inference result obtained by the inferring device 1220 may be input as an input value to the data trainer 1210 to be used as additional training data.

At least one of the data trainer 1210 and the inferring device 1220 may be manufactured in a form of at least one hardware chip and mounted on an electronic device. For example, at least one of the data trainer 1210 and the inferring device 1220 may be manufactured in a form of a dedicated hardware chip for AI, or manufactured as a part of an existing general purpose processor (for example, a central processing unit (CPU) or an application processor) or a graphic dedicated processor (for example, a graphic processing unit (GPU)) and mounted on various electronic devices described above.

In this case, the data trainer 1210 and the inferring device 1220 may be mounted on a single electronic device or on separated electronic devices, respectively. For example, one of the data trainer 1210 and the inferring device 1220 may be included in an electronic device, and the remaining one may be included in a server. Also, with regard to the data trainer 1210 and the inferring device 1220, information about a model established by the data trainer 1210 may be provided to the inferring device 1220, and data input to the inferring device 1220 may be provided as additional training data to the data trainer 1210, in a wired or wireless fashion.

Meanwhile, at least one of the data trainer 1210 and the inferring device 1220 may be implemented as a software module. When at least one of the data trainer 1210 and the inferring device 1220 is implemented as a software module (or a program module including an instruction), the software module may be stored in non-transitory computer readable media. Also, in this case, at least one software module may be provided by operating system (OS) or a preset application. Alternatively, some of at least one software module may be provided by OS, and the remaining part may be provided by a preset application.

Figure 13:
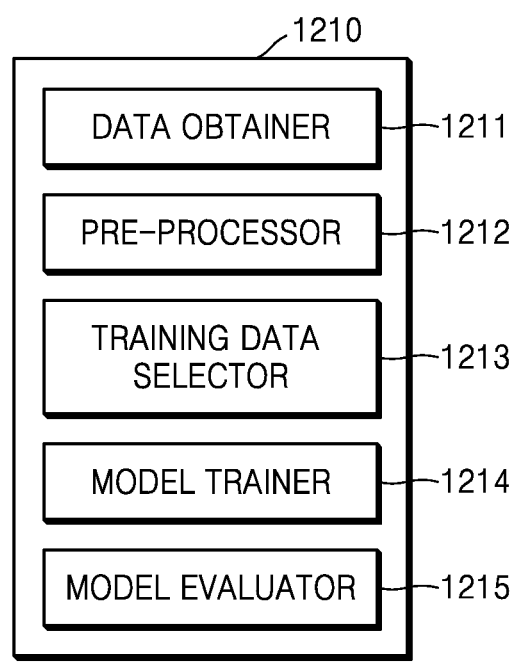
FIG. 13 is a block diagram of a data trainer 1210 according to an embodiment.

FIG. 13 is a block diagram of the data trainer 1210 according to an embodiment.

Referring to FIG. 13, the data trainer 1210 may include a data obtainer 1211, a pre-processor 1212, a training data selector 1213, a model trainer 1214, and a model evaluator 1215.

The data obtainer 1211 may obtain data about a pattern of a plurality of users' item consumption histories. The data obtainer 1211 may obtain data required for training of inferring a user's consumption history and the user's preference item. The data obtainer 1211 may obtain the data from an external server, such as at least one social network server, a cloud server, etc., connected to the computing device 1200 through a network, or from a database.

The pre-processor 1212 may pre-process the obtained data such that the data may be used for training for inferring a recommendation item from consumption information. The pre-processor 1212 may process the obtained data to a preset format such that the model trainer 1214 which will be described later may use the obtained data for the training of inferring the preference item from the consumption information. For example, the pre-processor 1212 may process the data to a preset format by removing redundant data or data with low probability from the obtained data or vectorizing metadata corresponding to each piece of the data, although not limited thereto.

The training data selector 1213 may select data required for training from among the pre-processed data. The selected data may be provided to the model trainer 1214. The training data selector 1213 may select data required for training from among the pre-processed data, according to preset criterion for recommending an item for a user. According to an embodiment, the training data selector 1213 may select data that is helpful in inferring the recommendation item from the consumption information. Also, the training data selector 1213 may select data according to preset criterion by training by the model trainer 1214 which will be described later.

The model trainer 1214 may train criterion about which training data needs to be used to infer the preference item from the consumption information. The model trainer 1214 may train kinds, numbers, levels, etc. of metadata attributes used to infer the user's preference item from metadata consumption information obtained to correspond to the consumption information.

Also, the model trainer 1214 may train a data inference model used to infer a recommendation item by using training data. In this case, the data inference model may be a model established in advance. For example, the data inference model may be a model established in advance by receiving basic training data.

The data inference model may be a model based on a neural network. For example, the data inference model may be a collaborative filtering model using an auto-encoder model, although not limited thereto.

According to various embodiments, when a plurality of data inference models established in advance exist, the model trainer 1214 may determine a data inference model having a great correlation between input training data and basic training data to be a data inference model to be trained. In this case, the basic training data may have been classified in advance according to types of data, and the data inference models may have been established in advance according to the types of data. For example, the basic training data may have been classified in advance according to various criteria, such as regions where training data has been generated, times at which training data has been generated, sizes of training data, genres of training data, generators of training data, kinds of objects in training data, etc.

Also, the model trainer 1214 may train the data inference model by using a training algorithm including, for example, error back-propagation or gradient descent.

Also, the model trainer 1214 may train the data inference model through supervised learning using training data as an input value. Also, the model trainer 1214 may train the data inference model, for example, through unsupervised learning of training a kind of data required to determine a user's state without any supervision to find criterion for determining the user's state. Also, the model trainer 1214 may train the data inference model, for example, through reinforcement learning of using a feedback about whether a result of a determination on a user's state according to training is correct.

Also, after the data inference model is trained, the model trainer 1214 may store the trained data inference model. In this case, the model trainer 1214 may store the trained data inference model in a memory. Alternatively, the model trainer 1214 may store the trained data inference model in a memory of a device including the inferring device 1220 which will be described later. Alternatively, the model trainer 1214 may store the trained data inference model in a memory of a server connected to an electronic device through a wired or wireless network.

In this case, the memory in which the trained data inference model is stored may store a command or data related to at least another component of the device, together. Also, the memory may store software and/or a program. The program may include, for example, a kernel, middleware, an application programming interface (API) and/or an application program (or "application").

The model evaluator 1215 may input evaluation data to the data inference model, and, when inference results output from the evaluation data do not satisfy preset criterion, the model evaluator 1215 may cause the model trainer 1214 to again perform training. In this case, the evaluation data may be preset data for evaluating the data inference model.

For example, when the number or portion of pieces of evaluation data of which inference results are incorrect with respect to results of recognition on the evaluation data by the trained data inference model exceeds a preset threshold value, the model evaluator 1215 may evaluate that the inference results do not satisfy the preset criterion. For example, the preset criterion may be defined as a portion of 2%. In this case, when the trained data inference model outputs wrong inference results for evaluation data that is more than 20 pieces of evaluation data among a total of 1000 pieces of evaluation data, the model evaluator 1215 may evaluate that the trained data inference model is not proper.

Meanwhile, when a plurality of trained data inference models exist, the model evaluator 1215 may evaluate whether each trained data inference model satisfies the preset criterion, and determine a model satisfying the preset criterion to be a final data inference model. In this case, when a plurality of data inference models satisfying the preset criterion exist, the model evaluator 1215 may determine one or a predetermined number of models in the order of the highest evaluation scores to be the final data inference models.

Meanwhile, at least one of the data obtainer 1211, the pre-processor 1212, the training data selector 1213, the model trainer 1214, and the model evaluator 1215 in the data trainer 1210 may be manufactured in a form of at least one hardware chip and mounted on an electronic device. For example, at least one of the data obtainer 1211, the pre-processor 1212, the training data selector 1213, the model trainer 1214, and the model evaluator 1215 may be manufactured in a form of a dedicated hardware chip for AI, or manufactured as a part of an existing general purpose processor (for example, a CPU or an application processor) or a graphic dedicated processor (for example, a GPU) and mounted on various electronic devices described above.

Also, the data obtainer 1211, the pre-processor 1212, the training data selector 1213, the model trainer 1214, and the model evaluator 1215 may be mounted on a single electronic device, or on separated electronic devices, respectively. According to an embodiment, the electronic device may include a computing device, an image display, etc. For example, some of the data obtainer 1211, the pre-processor 1212, the training data selector 1213, the model trainer 1214, and the model evaluator 1215 may be included in an electronic device, and the remaining part may be included in a server.

Also, at least one of the data obtainer 1211, the pre-processor 1212, the training data selector 1213, the model trainer 1214, and the model evaluator 1215 may be implemented as a software module. When at least one of the data obtainer 1211, the pre-processor 1212, the training data selector 1213, the model trainer 1214, and the model evaluator 1215 is implemented as a software module (or a program module including an instruction), the software module may be stored in non-transitory computer readable media. Also, in this case, at least one software module may be provided by OS or a preset application. Alternatively, some of at least one software module may be provided by OS, and the remaining part may be provided by a preset application.

Figure 14:
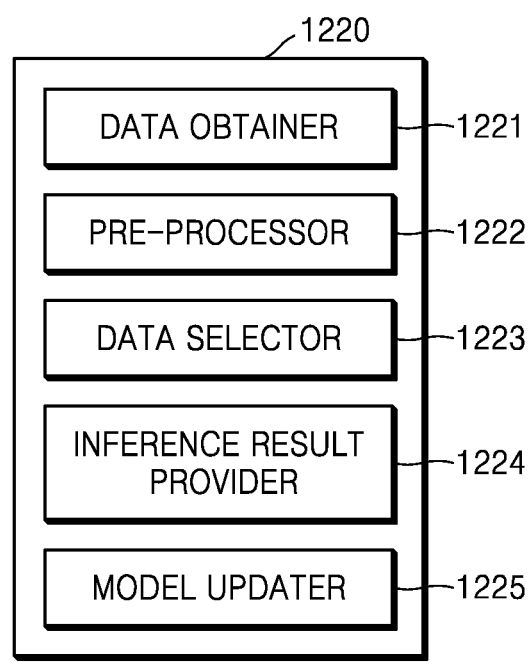
FIG. 14 is a block diagram illustrating a configuration of an inferring device 1220 according to an embodiment.

FIG. 14 is a block diagram illustrating a configuration of the inferring portion 1220 according to an embodiment.

Referring to FIG. 14, the inferring device 1220 according to some embodiments may include a data obtainer 1221, a pre-processor 1222, a data selector 1223, an inference result provider 1224, and a model updater 1225.

The data obtainer 1221 may obtain data for inferring an item matching with a user's preference from consumption information. The data for inferring the item matching with the user's preference may be information, such as a plurality of users' item use patterns, similarities between items, attributes of metadata for items, etc.

The pre-processor 1222 may pre-process the obtained data such that the obtained data may be used. The pre-processor 1222 may process the obtained data to a preset format such that the inference result provider 1224 which will be described later may use the obtained data to infer a user's taste or preference item from consumption information.

The data selector 123 may select data required for inferring a recommendation item from among the pre-processed data. The selected data may be provided to the inference result provider 1224. The data selector 1223 may select all or some of the pre-processed data according to preset criterion for inferring a recommendation item.

The inference result provider 1224 may apply the selected data to a data inference model to infer an item matching with the user's taste. The inference result provider 1224 may provide an inference result according to an inference purpose of data. The inference result provider 1224 may use data selected by the data selector 1223 as an input value to apply the selected data to the data inference model. Also, an inference result may be determined by the data inference model.

The inference result provider 1224 may provide a preference item inferred from consumption information. For example, the inference result provider 1224 may provide information about a list, a category, etc. in which an identified item is included.

The model updater 1225 may update the data inference model based on evaluation on the inference result provided from the inference result provider 1224. For example, the model updater 1225 may provide the inference result provided from the inference result provider 1224 to the model trainer 1214 to enable the model trainer 1214 to update the data inference model.

Meanwhile, at least one of the data obtainer 1221, the pre-processor 1222, the data selector 1223, the inference result provider 1224, and the model updater 1225 in the inferring device 1220 may be manufactured in a form of at least one hardware chip and mounted on an electronic device. For example, at least one of the data obtainer 1221, the pre-processor 1222, the data selector 1223, the inference result provider 1224, and the model updater 1225 may be manufactured in a form of a dedicated hardware chip for AI, or manufactured as a part of an existing general purpose processor (for example, a CPU or an application processor) or a graphic dedicated processor (for example, a GPU) and mounted on various electronic devices described above.

Also, the data obtainer 1221, the pre-processor 1222, the data selector 1223, the inference result provider 1224, and the model updater 1225 may be mounted on a single electronic device, or on separated electronic devices, respectively. For example, some of the data obtainer 1221, the pre-processor 1222, the data selector 1223, the inference result provider 1224, and the model updater 1225 may be included in an electronic device, and the remaining part may be included in a server.

Also, at least one of the data obtainer 1221, the pre-processor 1222, the data selector 1223, the inference result provider 1224, and the model updater 1225 may be implemented as a software module. When at least one of the data obtainer 1221, the pre-processor 1222, the data selector 1223, the inference result provider 1224, and the model updater 1225 is implemented as a software module (or a program module including an instruction), the software module may be stored in non-transitory computer readable media. Also, in this case, at least one software module may be provided by OS or a preset application. Alternatively, some of at least one software module may be provided by OS, and the remaining part may be provided by a preset application.

The computing device and the operating method thereof according to some embodiments may be implemented in the form of a computer-readable recording medium including an instruction that is executable by a computer, such as a program module that is executed by a computer. The computer-readable recording medium may be an arbitrary available medium which is able to be accessed by a computer, and may include a volatile or non-volatile medium and a separable or non-separable medium. Further, the computer-readable recording medium may include a computer storage medium and a communication medium. The computer storage medium may include volatile and non-volatile media and separable and non-separable media implemented by an arbitrary method or technology for storing information such as a computer readable instruction, a data structure, a program module, or other data. The communication medium may generally include a computer readable instruction, a data structure, a program module, other data of a modulated data signal such as a carrier wave, or another transmission mechanism, and include an arbitrary information transmission medium.

Also, in the present specification, the term "portion" or "part", and "device" may be a hardware component such as a processor or a circuit, and/or a software component that is executed by a hardware component such as a processor.

Also, the method of operating the computing device according to an embodiment of the disclosure may be implemented as a computer program product including a recording medium storing a computer program of performing the method of operating the computing device, the method including: inputting a recommendation recipient's item consumption information and metadata consumption information to a first neural network trained to receive a user's item consumption information and reconstruct the user's item consumption information and a second neural network embedded into the first neural network and having been trained with respect to the user's metadata consumption information; and obtaining item recommendation information to which metadata consumption information is reflected from the first neural network and the second neural network.

It should be understood that the above descriptions of the present disclosure are merely for illustrative purposes, and therefore, it will be apparent that those skilled in the art can readily make various modifications thereto without changing the technical spirit and essential features of the present disclosure. Thus, it should be understood that the embodiments described above are merely for illustrative purposes and not for limitation purposes in all aspects. For example, each component described as a single type may be implemented in a distributed form, and likewise, components described in a distributed form may be implemented in a combined form.

The invention claimed is:

1. A computing device comprising:
a memory storing one or more instructions; and
a processor configured to execute the one or more instructions stored in the memory, wherein the processor is configured to execute the one or more instructions to:
input consumption information of a recommendation recipient to a first neural network, the first neural network having been trained to receive item consumption information of a user and reconstruct the item consumption information of the user,
input metadata consumption information of the recommendation recipient corresponding to the item consumption information of the recommendation recipient to a second neural network embedded into the first neural network, the second neural network having been trained with respect to metadata consumption information corresponding to the item consumption information, and
obtain item recommendation information to which the metadata consumption information of the recommendation recipient is reflected from the first neural network with the second neural network embedded therein,
wherein the second neural network is embedded into a latent layer of the first neural network.

2. The computing device of claim 1, wherein the first neural network is a collaborative filtering model using an auto-encoder model configured to encode the item consumption information to obtain the latent layer having compressed information with respect to the item consumption information, and decode the latent layer to reconstruct the item consumption information.

3. The computing device of claim 2, wherein the second neural network comprises N neural networks that have independently trained consumption information for N different pieces of metadata, wherein N is a natural number that is greater than or equal to 2.

4. The computing device of claim 3, wherein the N neural networks comprise embedding nodes, respectively, and the embedding nodes of the N neural networks are embedded into the latent layer of the first neural network.

5. The computing device of claim 4, wherein the consumption information of the recommendation recipient comprises at least one of item consumption information and metadata preference information of the recommendation recipient, and
when the metadata preference information of the recommendation recipient is preference information for M pieces of the metadata, wherein M is a natural number that is less than N, the processor is further configured to execute the one or more instructions to activate M neural networks among the N neural networks included in the second neural network and obtain the item recommendation information to which M pieces of the metadata consumption information are reflected.

6. The computing device of claim 5, wherein the processor is further configured to execute the one or more instructions to activate the M neural networks by setting edge values of the embedding nodes, except for the embedding nodes of the M neural networks, to 0.

7. The computing device of claim 5, wherein the processor is further configured to execute the one or more instructions to activate the M neural networks by mapping the embedding nodes of the M neural networks to new nodes having an edge value of 1, and mapping the remaining embedding nodes to other new nodes having an edge value of 0.

8. The computing device of claim 4, wherein the processor is further configured to execute the one or more instructions to train the first neural network to receive and reconstruct the item consumption information of the user, embed the second neural network into the first neural network which has completed training, and then train the second neural network so that reconstructed information is output from the first neural network, when the item consumption information of the user and the metadata of the item are input to the first neural network and the second neural network.

9. The computing device of claim 8, wherein the processor is further configured to execute the one or more instructions to train the second neural network, in a state in which an edge value of the first neural network is fixed.

10. The computing device of claim 9, wherein the processor is further configured to execute the one or more instructions to independently embed the embedding nodes of the N neural networks into the latent layer to independently train the N neural networks.

11. The computing device of claim 9, wherein the second neural network comprises a consumption information vector representing metadata consumption information of the user, and an embedding matrix configured to perform an operation with the consumption information vector to obtain an embedding vector,
the embedding vector is mapped to a preset number of embedding nodes and embedded into the latent layer, and the processor is further configured to execute the one or more instructions to train the embedding matrix to obtain output values of the embedding nodes.

12. The computing device of claim 11, wherein the processor is further configured to execute the one or more instructions to obtain the preset number of embedding nodes by reducing a dimension of the embedding vector through a preset number of hidden layers.

13. The computing device of claim 1, further comprising a communicator configured to transmit/receive a signal to/from a user equipment (UE),
wherein the communicator is configured to receive the consumption information of the recommendation recipient from the UE, and the processor is further configured to execute the one or more instructions to obtain the item recommendation information to which the metadata consumption information is reflected and transmit the item recommendation information to the UE through the communicator.

14. The computing device of claim 1, wherein the consumption information of the recommendation recipient comprises at least one of item consumption information and metadata preference information of the recommendation recipient,
wherein the computing device further comprises a display outputting an image, and a user interface configured to receive the consumption information of the recommendation recipient, and
wherein the processor is further configured to execute the one or more instructions to output, through the display, the item recommendation information.

15. A method of operating a computing device, the method comprising:
inputting consumption information of a recommendation recipient to a first neural network, the first neural network having been trained to receive item consumption information of a user and reconstruct the item consumption information of the user;
inputting metadata consumption information of the recommendation recipient corresponding to the consumption information of the recommendation recipient to a second neural network embedded into the first neural network, the second neural network having been trained with respect to metadata consumption information corresponding to the item consumption information of the user; and
obtaining item recommendation information to which the metadata consumption information of the recommendation recipient is reflected from the first neural network with the second neural network embedded therein,
wherein the second neural network is embedded into a latent layer of the first neural network.

* * * * *